US012647686B2

(12) United States Patent
Yi et al.

(10) Patent No.: US 12,647,686 B2
(45) Date of Patent: Jun. 2, 2026

(54) VIDEO RECORDING METHOD AND RELATED APPARATUS

(71) Applicant: Honor Device Co., Ltd., Shenzhen (CN)

(72) Inventors: Jie Yi, Shenzhen (CN); Yufei Huang, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 30 days.

(21) Appl. No.: 18/695,516

(22) PCT Filed: May 6, 2023

(86) PCT No.: PCT/CN2023/092393
§ 371 (c)(1),
(2) Date: Mar. 26, 2024

(87) PCT Pub. No.: WO2023/226721
PCT Pub. Date: Nov. 30, 2023

(65) Prior Publication Data
US 2025/0016453 A1     Jan. 9, 2025

(30) Foreign Application Priority Data

May 25, 2022    (CN) ........................ 202210577630.X

(51) Int. Cl.
*H04N 23/695*      (2023.01)
*H04N 23/63*       (2023.01)
*H04N 23/67*       (2023.01)
(52) U.S. Cl.
CPC ......... *H04N 23/695* (2023.01); *H04N 23/632* (2023.01); *H04N 23/671* (2023.01)
(58) Field of Classification Search
CPC .. G09G 2352/00; G09G 5/14; H04N 21/4223; H04N 21/4316; H04N 21/44008;
(Continued)

(56) References Cited

U.S. PATENT DOCUMENTS 8,887,311  B1 *  11/2014  Kirishima .............. G01Q 40/00
                                                                     850/8
11,765,463  B2      9/2023  Li et al.
(Continued)

FOREIGN PATENT DOCUMENTS

CN        104252629  A      12/2014
CN        110248254  A       9/2019
(Continued)

OTHER PUBLICATIONS

Fei, Fan, "Research and Implementation of Human Abnormal Behavior Detection Algorithm in the Intelligent Surveillance," Nanjing University of Posts and Telecommunications, 65 pages (with English abstract) (Apr. 2014).

*Primary Examiner* — Clifford Hilaire
(74) *Attorney, Agent, or Firm* — Leydig, Voit & Mayer, Ltd.

(57)            ABSTRACT

Embodiments of this application provide a video recording method and a related apparatus. The method includes: displaying a first interface including a first window, where pictures acquired by a camera in real time and tracking identities are displayed in the first window; receiving a first operation for a first tracking identity; displaying a second interface in response to the first operation, where the second interface includes the first window and a second window, a part of pictures related to a first object in the first window are displayed in the second window, and the first object is an object corresponding to the first tracking identity; detecting, at a first moment, that the first object is displayed at a first position of the first window, and detecting, at a second moment, that the first object is displayed at a second position of the first window.

17 Claims, 21 Drawing Sheets

(58) Field of Classification Search
CPC ... H04N 21/440263; H04N 5/445; H04N 5/45
See application file for complete search history.

(56) References Cited

U.S. PATENT DOCUMENTS

| | | | |
|---|---|---|---|
| 2008/0175576 A1* | 7/2008 | Hong | G03B 13/18 |
| | | | 396/89 |
| 2013/0314562 A1 | 11/2013 | Shibuya et al. | |
| 2015/0062434 A1* | 3/2015 | Deng | H04N 21/440263 |
| | | | 348/565 |
| 2015/0179219 A1* | 6/2015 | Gao | G06V 10/24 |
| | | | 386/278 |
| 2018/0152666 A1 | 5/2018 | Taine et al. | |
| 2019/0050629 A1* | 2/2019 | Olgiati | G06T 7/20 |
| 2020/0074738 A1 | 3/2020 | Hare et al. | |
| 2022/0319033 A1* | 10/2022 | Kim | G06T 7/70 |
| 2023/0040548 A1 | 2/2023 | Jiang et al. | |

FOREIGN PATENT DOCUMENTS

| | | | |
|---|---|---|---|
| CN | 111008621 A | 4/2020 | |
| CN | 111163267 A | 5/2020 | |
| CN | 112954218 A | 6/2021 | |
| CN | 112954219 A | 6/2021 | |
| CN | 113067983 A | 7/2021 | |
| CN | 113536866 A | 10/2021 | |
| CN | 113766129 A | 12/2021 | |
| CN | 114390191 A | 4/2022 | |
| CN | 114430457 A | 5/2022 | |
| JP | 201234242 A | 2/2012 | |

* cited by examiner

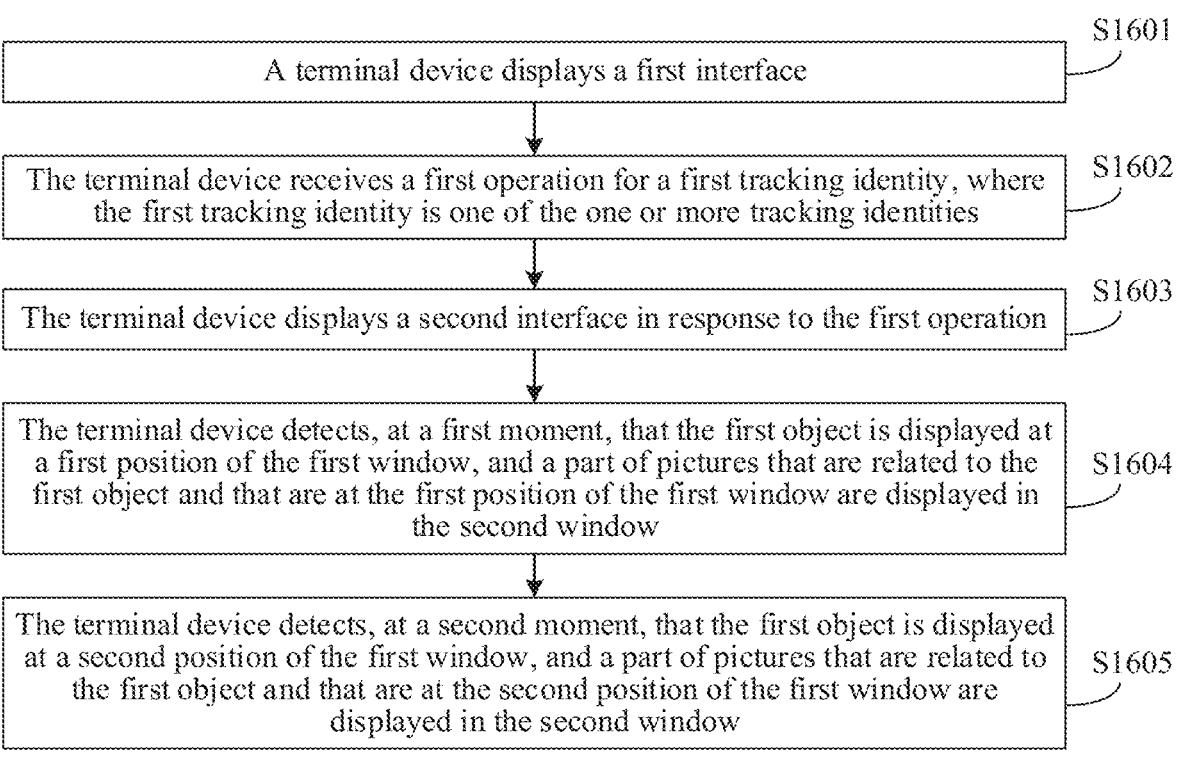

S1601

A terminal device displays a first interface

S1602

The terminal device receives a first operation for a first tracking identity, where the first tracking identity is one of the one or more tracking identities

S1603

The terminal device displays a second interface in response to the first operation

S1604

The terminal device detects, at a first moment, that the first object is displayed at a first position of the first window, and a part of pictures that are related to the first object and that are at the first position of the first window are displayed in the second window

S1605

The terminal device detects, at a second moment, that the first object is displayed at a second position of the first window, and a part of pictures that are related to the first object and that are at the second position of the first window are displayed in the second window

FIG. 16

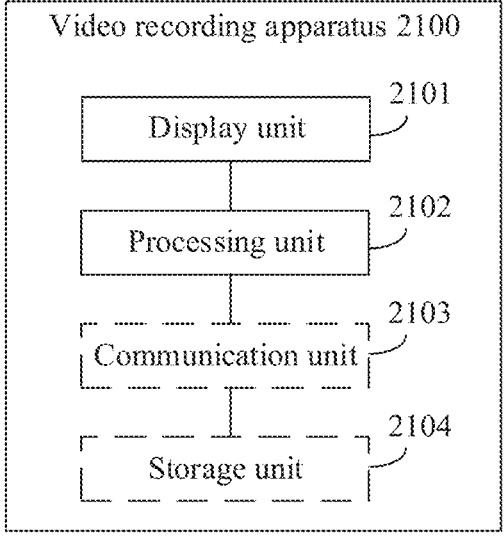

Video recording apparatus 2100

2101
Display unit

2102
Processing unit

2103
Communication unit

2104
Storage unit

FIG. 17

VIDEO RECORDING METHOD AND RELATED APPARATUS

CROSS-REFERENCE TO RELATED APPLICATIONS

This application is a national stage of International Application No. PCT/CN2023/092393, filed on May 6, 2023, which claims priority to Chinese Patent Application No. 202210577630.X, filed on May 25, 2022, both of which are hereby incorporated by reference in their entireties.

TECHNICAL FIELD

This application relates to the field of terminal technologies, and in particular, to a video recording method and a related apparatus.

BACKGROUND

To improve user experience, a plurality of cameras are usually configured on an electronic device such as a mobile phone or a tablet computer. For example, a front-facing camera and a rear-facing camera are respectively configured on the electronic device. A user may select a corresponding capturing mode based on needs of the user, such as a front camera mode, a rear camera mode, or a front-rear dual camera mode.

In some scenarios, a video captured by the user by using the electronic device includes one or more characters. When the user intends to obtain a video with a single character, the user needs to perform manual editing processing on the video.

However, a manual editing manner is cumbersome and inefficient, making the user experience of the electronic device poor.

SUMMARY

Embodiments of this application provide a video recording method and a related apparatus, applied to an electronic device. According to the method, during video capturing, a selected character can be tracked to additionally generate a video, without the need for manual editing by a user, thereby reducing user operations and improving user experience.

According to a first aspect, an embodiment of this application provides a video recording method, applied to a terminal device including a first camera. The method includes: displaying, by the terminal device, a first interface, where the first interface includes a first window, and pictures acquired by the first camera in real time and one or more tracking identities are displayed in the first window; receiving, by the terminal device, a first operation for a first tracking identity, where the first tracking identity is one of the one or more tracking identities; displaying, by the terminal device, a second interface in response to the first operation, where the second interface includes the first window and a second window, the pictures acquired by the first camera in real time are displayed in the first window, a part of pictures related to a first object in the first window are displayed in the second window, and the first object is an object corresponding to the first tracking identity; detecting, by the terminal device at a first moment, that the first object is displayed at a first position of the first window, and a part of pictures that are related to the first object and that are at the first position of the first window are displayed in the second window; and detecting, by the terminal device at a second moment, that the first object is displayed at a second position of the first window, and a part of pictures that are related to the first object and that are at the second position of the first window are displayed in the second window.

The first window may be a preview region or a recording region as described below. The tracking identity may be a tracking box as described below, or may be in another form (for example, a thumbnail of an object, a number, or an icon), which is not limited herein. The tracking identity may alternatively be at a position at which an object is displayed, or may be arranged and displayed on an edge of the preview region or the recording region, which is not limited herein.

The first tracking identity may be a tracking identity corresponding to any object, for example, a tracking box corresponding to a male character. A trigger operation for the first tracking identity may be a click operation, or may be a touch operation. A type of the trigger operation is not limited in this embodiment of this application.

It may be understood that, in response to the first operation, a tracking target is set, and an interface with a small window is displayed. The part of pictures related to the first object in the first window may be understood as tracking pictures as described below. Before the tracking target is set, the terminal device does not display the small window. After the tracking target is set, the terminal device displays the small window.

In this embodiment of this application, a focus changes with a position of a focusing target. Specifically, for an illustration of how the focus changes with the position of the focusing target, refer to FIG. 3B or FIG. 3C. For example, an interface at the first moment may be an interface shown in a of FIG. 3B, and an interface at the second moment may be an interface shown in b of FIG. 3B; or the interface at the first moment may be an interface shown in a of FIG. 3C, and the interface at the second moment may be an interface shown in b of FIG. 3C.

Optionally, the pictures displayed in the second window are obtained through cropping based on the pictures displayed in the first window.

Optionally, the first interface is a preview interface in a video recording process, the first window further includes a first control, and the method further includes: receiving, by the terminal device, a second operation for the first control; and ending, by the terminal device, recording in response to the second operation, and storing a first video and a second video, where the first video is a video formed by the pictures displayed in the first window, and the second video is a video formed by the pictures displayed in the second window.

In this embodiment of this application, the second operation may be a user click operation, or may be a user touch operation. The second operation is not limited in this embodiment of this application. The first video may be a video generated based on recording pictures displayed in the recording region, and the second video may be a video generated based on tracking pictures displayed in the small window.

The first control may be an end control. For example, the first control may be an end control 318 shown in a of FIG. 3C. When the terminal device detects an operation in which a user clicks the end control 318, the terminal device ends recording, generates a video based on recording pictures displayed in a recording region, and generates a focusing video based on tracking pictures displayed in a small window.

In this way, the terminal device may store two videos, and additionally generate a video based on the tracking target, without the need for video editing by the user, so that the video of the tracking target can be obtained, thereby improving user experience.

Optionally, the tracking identities are in a one-to-one correspondence with objects that are displayed in the first window and that are detected by the terminal device.

In this way, each tracking identity corresponds to one object, which can make it easier for the user to select an object, thereby improving user experience.

Optionally, the method further includes: when the terminal device detects that a second object and a third object in the first window overlap, displaying, by the terminal device, a second tracking identity of the second object or a third tracking identity of the third object.

It may be understood that, the second object and the third object are not a same object; or the second object or the third object may be the first object, which are not limited herein.

In this embodiment of this application, the second object and the third object may be a male character and a female character respectively in FIG. 11B, or a male character and a female character respectively in FIG. 14, which are not limited herein.

For example, for a specific display situation of an interface shown in FIG. 11B or an interface shown in FIG. 14, refer to corresponding descriptions in FIG. 11B and FIG. 14. Details are not described herein again.

In this way, the terminal device may not display a tracking identity corresponding to one object, which can reduce overlapping of tracking identities, reduce false triggering of the user, and also make the interface cleaner.

Optionally, the when the terminal device detects that a second object and a third object in the first window overlap, displaying, by the terminal device, a second tracking identity of the second object or a third tracking identity of the third object includes: when the terminal device detects that the second object and the third object in the first window overlap, determining, by the terminal device based on one or more of the following information, that the terminal device displays the second tracking identity of the second object or the third tracking identity of the third object: an area occupied by the second object in the pictures of the first window, an area occupied by the third object in the pictures of the first window, a focal length between the second object and the first camera, and a focal length between the third object and the first camera.

An area occupied by an object may alternatively be understood as a size of the object, for example, an area occupied by a character and a size occupied by the character in descriptions corresponding to the interface shown in FIG. 11B as described below. A focal length of the object may be understood as a distance between the object and a camera, or may be understood as a distance between the object and the terminal device, for example, a distance between the character and a camera in the descriptions corresponding to the interface shown in FIG. 11B as described below.

The terminal device may determine a displayed tracking identity or a non-displayed tracking identity based on the area occupied by the object or the focal length of the object.

Optionally, the determining, by the terminal device based on one or more of the following information of the second object and the third object, that the terminal device displays the second tracking identity of the second object or the third tracking identity of the third object includes: when the area of the second object in the first window is less than or equal to the area of the third object in the first window, displaying, by the terminal device, the third tracking identity, and skipping displaying the second tracking identity; or when the terminal device detects that the focal length between the second object and the first camera is less than or equal to the focal length between the third object and the first camera, displaying, by the terminal device, the second tracking identity, and skipping displaying the third tracking identity.

It may be understood that, a larger area occupied by an object indicates a higher probability that the object is set by the user as a tracking target; and a smaller focal length between the object and the first camera indicates a closer distance between the object and the terminal device and a higher probability that the object is set by the user as the tracking target.

In this way, the terminal device may determine whether to display a tracking identity corresponding to the object based on the area occupied by the object, the focal length between the object and the first camera, and the like. For details, refer to corresponding descriptions in FIG. 11B and FIG. 14 as described below. Details are not described herein again.

Optionally, the method further includes: when a distance between a center position of the second tracking identity and a center position of the third tracking identity in a first preset direction is greater than or equal to a first preset spacing, or a distance between the center position of the second tracking identity and the center position of the third tracking identity in a second preset direction is greater than or equal to a second preset spacing, detecting, by the terminal device, that the second object and the third object in the first window overlap.

The first preset direction may be a horizontal direction, or may be a vertical direction, or may be a diagonal direction. The second preset direction may be a horizontal direction or a vertical direction, or may be a diagonal direction.

The terminal device may determine whether two objects overlap based on center positions of tracking identities corresponding to the two objects, to determine whether to display, which facilitates calculation of whether the objects overlap, and can reduce an amount of calculation.

Optionally, the first preset spacing is half of a sum of a first length and a second length, where the first length is a length of the second tracking identity in the first preset direction, and the second length is a length of the third tracking identity in the first preset direction; and the second preset spacing is half of a sum of a third length and a fourth length, where the third length is a length of the second tracking identity in the second preset direction, and the fourth length is a length of the third tracking identity in the second preset direction.

When tracking identities each are a rectangle or a square, a preset spacing is half of a sum of lengths of the tracking identities in a same direction.

Optionally, the first preset direction is a horizontal direction, and the second preset direction is a vertical direction.

Optionally, the method further includes: when a distance between a center position of a second tracking identity and a center position of a third tracking identity in a first preset direction is greater than or equal to a first preset spacing, or a distance between the center position of the second tracking identity and the center position of the third tracking identity in a second preset direction is greater than or equal to a second preset spacing, adjusting, by the terminal device, a position of the second tracking identity and/or a position of the third tracking identity, until the distance between the center position of the second tracking identity and the center position of the third tracking identity in the first preset direction is less than the first preset spacing, or the distance between the center position of the second tracking identity and the center position of the third tracking identity in the second preset direction is less than the second preset spacing.

When characters overlap or tracking identities overlap, the terminal device may reduce overlapping of the tracking identities by adjusting a position of a tracking identity. Another adjustment method is provided. In the adjustment method, the user may set any one of overlapped objects as a tracking target. For example, for a specific adjustment manner, refer to corresponding descriptions in FIG. 11A and FIG. 13 as described below. Details are not described herein again.

Optionally, when the terminal device displays a plurality of tracking identities, sizes of the tracking identities are the same.

For example, as shown in FIG. 8C, a size of a tracking box is fixed, which can reduce a situation in which the tracking box is too small or too large.

Optionally, when the terminal device displays a plurality of tracking identities, sizes of the tracking identities are different, where a size of each tracking identity is determined by the terminal device based on a size or an area occupied by an object corresponding to each tracking identity in the first window; or the size of each tracking identity is determined by the terminal device based on a focal length between the object corresponding to each tracking identity and the first camera.

For example, as shown in FIG. 8A and FIG. 8B, a size of a tracking box is fixed. The terminal device may adaptively adjust a specification of a tracking box based on a size of a character.

Optionally, the object includes the first object and a fourth object; and when a size of the first object in a first picture is greater than a size of the fourth object in the first picture, a size of the first tracking identity is greater than a size of a fourth tracking identity corresponding to the fourth object; or when an area of the first object in the first picture is greater than an area of the fourth object in the first picture, the size of the first tracking identity is greater than the size of the fourth tracking identity; or when the terminal device detects that a focal length between the first object and the first camera is greater than a focal length between the fourth object and the first camera, the size of the first tracking identity is greater than the size of the fourth tracking identity.

In this embodiment of this application, the fourth object is different from the first object, and may be the second object, or may be the third object, or may be another object, which is not limited herein.

The terminal device may display a plurality of tracking identities. The terminal device may adaptively adjust a specification of a tracking box based on a size of a character, a focal length between an object and the camera, and the like. Another manner for displaying a tracking identity is provided, to improve user experience.

Optionally, when a quantity of objects that are displayed in the first window and that are detected by the terminal device is greater than N, the first interface includes N tracking identities, where N is an integer.

N may be 5 or any another value. In this way, a quantity of tracking identities displayed when there are more objects can be limited, to reduce picture clutter caused by too many tracking identities. In addition, limiting the quantity of tracking identities can also reduce computing requirements of the terminal device, reduce freezing of the terminal device, reduce power consumption, and the like, and can also reduce hardware requirements of the terminal device and increase applicability.

Optionally, objects corresponding to the N tracking identities are objects of top N sizes in descending order of sizes of the objects in the first picture; or the objects corresponding to the N tracking identities are objects whose sizes are top N in ascending order of distances between the objects and the first camera and that are detected by the terminal device.

Optionally, when the terminal device displays the second interface, a focus of the first camera is on the first object; at the first moment, the focus of the first camera is on the first object; and at the second moment, the focus of the first camera is on the first object.

In this way, the terminal device may perform focusing based on a tracking target, making the tracking target clearer.

According to a second aspect, an embodiment of this application provides a terminal device. The terminal device may also be referred to as a terminal, a user equipment (UE), a mobile station (MS), a mobile terminal (MT), or the like. The terminal device may be a mobile phone, an intelligent television, a wearable device, a tablet computer (Pad), a computer with a wireless transceiver function, a virtual reality (VR) terminal device, an augmented reality (AR) terminal device, a wireless terminal in industrial control, a wireless terminal in self-driving, a wireless terminal in remote medical care, a wireless terminal in a smart grid, a wireless terminal in transportation safety, a wireless terminal in a smart city, a wireless terminal in a smart home, or the like.

The terminal device includes a processor, and the processor is configured to invoke a computer program stored in a memory, to perform the method according to the first aspect.

According to a third aspect, an embodiment of this application provides a computer-readable storage medium, where the computer-readable storage medium includes computer instructions, the computer instructions, when run on a terminal device, enabling the terminal device to perform the method according to the first aspect.

According to a fourth aspect, an embodiment of this application provides a computer program product, a computer program, when executed, enabling a terminal device to perform the method according to the first aspect.

According to a fifth aspect, an embodiment of this application provides a chip. The chip includes a processor, and the processor is configured to invoke a computer program stored in a memory, to perform the method according to the first aspect.

It should be understood that, the technical solutions of the second aspect to the fifth aspect of this application correspond to those of the first aspect of this application, and the beneficial effects obtained by the aspects and the corresponding feasible implementations are similar, and details are not described again.

BRIEF DESCRIPTION OF DRAWINGS

FIG. 16 is a schematic flowchart of a video recording method according to an embodiment of this application; and FIG. 17 is a schematic diagram of a structure of a video recording apparatus according to an embodiment of this application.

DESCRIPTION OF EMBODIMENTS

Figure 1:
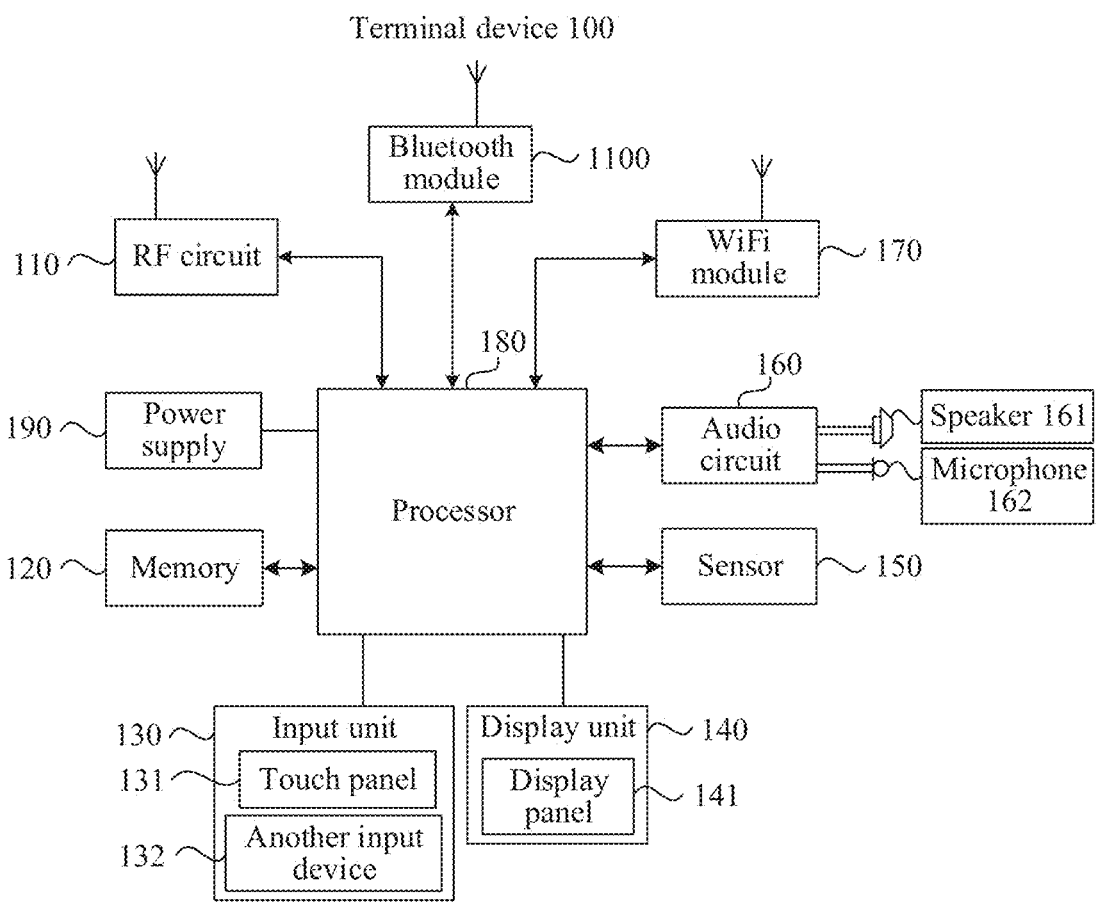
FIG. 1 is a schematic diagram of a structure of a hardware system of a terminal device according to an embodiment of this application.

For ease of describing the technical solutions in embodiments of this application clearly, in embodiments of this application, terms such as "first" and "second" are used to distinguish same or similar items with a basically same function and role. For example, a first chip and a second chip are merely used to distinguish between different chips, and are not intended to limit a sequence thereof. A person skilled in the art may understand that the terms such as "first" and "second" do not limit a quantity or an execution sequence, and the terms such as "first" and "second" do not indicate a definite difference.

It should be noted that, in embodiments of this application, the term "example" or "for example" or the like is used to represent giving an example, an illustration, or a description. Any embodiment or design solution described as an "example" or "for example" in this application should not be explained as being more preferred or having more advantages than another embodiment or design solution. Exactly, use of the term such as "example" or "for example" is intended to present a related concept in a specific manner.

In embodiments of this application, "at least one" means one or more, and "a plurality of" means two or more. "And/or" describes an association relationship for describing associated objects and represents that three relationships may exist. For example, A and/or B may represent that: only A exists, both A and B exist, and only B exists, where A and B may be singular or plural. The character "/" generally indicates an "or" relationship between the associated objects. "At least one of the following" or a similar expression thereof refers to any combination of these items, including one item or any combination of a plurality of items. For example, at least one of a, b, or c may represent a, b, c, "a and b", "a and c", "b and c", or "a, b, and c", where a, b, and c may be singular or plural.

Embodiments of this application provide a video recording method, which may be applied to an electronic device that has a capturing function. The electronic device includes a terminal device, and the terminal device may also be referred to as a terminal, a user equipment (UE), a mobile station (MS), a mobile terminal (MT), or the like. The terminal device may be a mobile phone, an intelligent television, a wearable device, a tablet computer (Pad), a computer with a wireless transceiver function, a virtual reality (VR) terminal device, an augmented reality (AR) terminal device, a wireless terminal in industrial control, a wireless terminal in self-driving, a wireless terminal in remote medical care, a wireless terminal in a smart grid, a wireless terminal in transportation safety, a wireless terminal in a smart city, a wireless terminal in a smart home, or the like. A specific technology and a specific device form that are used by the terminal device are not limited in embodiments of this application.

To make embodiments of this application more comprehensible, the following describes a structure of the terminal device in embodiments of this application.

FIG. 1 is a schematic diagram of a structure of a terminal device 100. The terminal device may include components such as a radio frequency (RF) circuit 110, a memory 120, an input unit 130, a display unit 140, a sensor 150, an audio circuit 160, a wireless fidelity (WiFi) module 170, a processor 180, a power supply 190, and a Bluetooth module 1100. A person skilled in the art may understand that the structure of the terminal device shown in FIG. 1 is not intended to limit the terminal device, and the terminal device may include more components or fewer components than those shown in the figure, or some components may be combined, or a different component deployment may be used.

The following specifically describes the components of the terminal device with reference to FIG. 1.

The RF circuit 110 may be configured to receive and send a signal in an information receiving and sending process or a call process, and in particular, after downlink information of a base station is received, send the downlink information to the processor 180 for processing. In addition, the RF circuit sends uplink data to the base station. Usually, the RF circuit includes, but not limited to: an antenna, at least one amplifier, a transceiver, a coupler, a low noise amplifier (LNA), a duplexer, and the like. In addition, the RF circuit 110 may also communicate with a network and another device by wireless communication. The wireless communication may use any communication standard or protocol, including, but not limited to: global system of mobile communication (GSM), general packet radio service (GPRS), code division multiple access (CDMA), wideband code division multiple access (WCDMA), long term evolution (LTE), email, short messaging service (SMS), and the like.

The memory 120 may be configured to store a software program and a module, and the processor 180 runs the software program and the module that are stored in the memory 120, to perform various functional applications and data processing of the terminal device. The memory 120 may mainly include a program storage region and a data storage region. The program storage region may store an operating system, an application program required by at least one function (for example, a sound playback function and an image playback function), a boot loader, or the like. The data storage region may store data (for example, audio data and a phone book) created according to use of the terminal device. In addition, the memory 120 may include a high speed random access memory, and may also include a non-volatile memory, such as at least one magnetic disk storage device, a flash memory, or another volatile solid-state storage device. It may be understood that, in this embodiment of this application, the memory 120 stores a Bluetooth device reconnection program.

The input unit 130 may be configured to receive input digit or character information, and generate a keyboard signal input related to a user setting and function control of the terminal device. Specifically, the input unit 130 may include a touch panel 131 and another input device 132. The touch panel 131 is also referred to as a touchscreen, may collect a touch operation that is performed by a user on or near the touch panel 131 (for example, an operation that is performed by a user by using any appropriate object or accessory such as a finger or a stylus on or near the touch panel 131), and drive a corresponding connection apparatus according to a preset program. Optionally, the touch panel 131 may include two parts: a touch detection apparatus and a touch controller. The touch detection apparatus detects a touch orientation of the user, detects a signal brought through the touch operation, and transmits the signal to the touch controller. The touch controller receives touch information from the touch detection apparatus, converts the touch information into a contact coordinate, then transmits the contact coordinate to the processor 180, receives and executes a command transmitted by the processor 180. In addition, the touch panel 131 may be implemented by using various types, such as a resistive type, a capacitance type, an infrared type, and a surface acoustic wave type. In addition to the touch panel 131, the input unit 130 may further include the another input device 132. Specifically, the another input device 132 may include, but not limited to: one or more of a physical keyboard, a functional key (such as a volume control key or a switch key), a track ball, a mouse, and a joystick.

The display unit 140 may be configured to display information input by the user or information provided for the user, and various menus of the terminal device. The display unit 140 may include a display panel 141. Optionally, the display panel 141 may be configured by using a liquid crystal display (LCD), an organic light-emitting diode (OLED), or the like. Further, the touch panel 131 may cover the display panel 141. After detecting a touch operation on or near the touch panel, the touch panel 131 transfers the touch operation to the processor 180, to determine a type of a touch event. Then, the processor 180 provides a corresponding visual output on the display panel 141 based on the type of the touch event. Although in FIG. 1, the touch panel 131 and the display panel 141 are used as two separate parts to implement input and output functions of the terminal device, in some embodiments, the touch panel 131 and the display panel 141 may be integrated to implement the input and output functions of the terminal device.

The terminal device may further include at least one sensor 150, such as an optical sensor, a motion sensor, and other sensors. Specifically, the optical sensor may include an ambient light sensor and a proximity sensor. The ambient light sensor may adjust luminance of the display panel 141 according to brightness of the ambient light. The proximity sensor may switch off the display panel 141 or backlight when the terminal device is moved to the ear. As one type of motion sensor, an accelerometer sensor can detect magnitudes of accelerations in various directions (generally, on three axes), may detect a magnitude and a direction of the gravity when static, and may be configured to recognize attitude application of the terminal device (for example, switching between landscape orientation and portrait orientation, a related game, and magnetometer attitude calibration), a function related to vibration recognition (such as a pedometer and a knock), and the like. As to other sensors such as a gyroscope, a barometer, a hygrometer, a thermometer, and an infrared sensor that may be further configured on the terminal device, details are not repeatedly described herein.

The audio circuit 160, a speaker 161, and a microphone 162 may provide audio interfaces between the user and the terminal device. The audio circuit 160 may transmit, to the speaker 161, an electrical signal obtained by converting received audio data, and the speaker 161 converts the electrical signal into a voice signal for outputting. According to another aspect, the microphone 162 converts the collected sound signal into an electrical signal, the electrical signal is converted into audio data after received by the audio circuit 160, and the audio data is sent to another terminal device through the RF circuit 110 after being outputted to the processor 180 for processing, or the audio data is outputted to the memory 120 for further processing.

WiFi belongs to a short distance wireless transmission technology. The terminal device may help, by using the WiFi module 170, a user to receive and send an email, browse a web page, access stream media, and the like. This provides wireless broadband Internet access for the user. Although FIG. 1 shows the WiFi module 170, it may be understood that the WiFi module 170 is not an essential component of the terminal device, and the WiFi module 170 may be omitted as required, provided that the scope of the essence of the present disclosure is not changed.

The processor 180 is a control center of the terminal device, and connects to various parts of the terminal device using various interfaces and lines. By running or executing the software program or module stored in the memory 120, and invoking data stored in the memory 120, the processor 180 performs various functions and data processing of the terminal device, thereby performing overall monitoring on the terminal device. Optionally, the processor 180 may include one or more processing units. Preferably, the processor 180 may integrate an application processor and a modem. The application processor mainly processes an operating system, a user interface, an application program, and the like. The modem mainly processes wireless communication. It may be understood that, the foregoing modem may not be integrated into the processor 180.

It may be understood that, in this embodiment of this application, the memory 120 stores a video recording program, and the processor 180 may be configured to invoke and execute the video recording program stored in the memory 120, to implement the video recording method provided in this embodiment of this application.

The terminal device further includes the power supply 190 (such as a battery) for supplying power to the components. Preferably, the power supply may be logically connected to the processor 180 by using a power management system, thereby implementing functions such as charging, discharging, and power consumption management by using the power management system.

A Bluetooth technology is a short-distance wireless transmission technology, and the terminal device may exchange, by using the Bluetooth module 1100, data with another terminal device equipped with a Bluetooth module, to perform data transmission based on a Bluetooth communication link. The Bluetooth module 1100 may be a bluetooth low energy (BLE), a module, or the like based on an actual need. It may be understood that, in a case that the terminal device in this embodiment of this application is a user terminal and a service machine, and the terminal device includes a Bluetooth module. However, it may be understood that, the Bluetooth module is not an essential component of the terminal device, and may be omitted as required, provided that the scope of the essence of the present disclosure is not changed. For example, a server may not include the Bluetooth module.

Although not shown in the figure, the terminal device further includes a camera. Optionally, a position of the camera on the terminal device may be front-facing, or may be rear-facing, or may be built-in (can be extended out of a body during use). This is not limited in this embodiment of this application.

Optionally, the terminal device may include a single camera, two cameras, three cameras, or the like. This is not limited in this embodiment of this application. The camera includes, but not limited to: a wide-angle camera, a telephoto camera, a depth camera, or the like. For example, the terminal device may include three cameras, where one is a main camera, another is a wide-angle camera, another is a telephoto camera.

Optionally, when the terminal device includes a plurality of cameras, the plurality of cameras may be all front-facing, or all rear-facing, or all built-in, or at least partially front-facing, or at least partially rear-facing, or at least partially built-in, or the like. This is not limited in this embodiment of this application.

Figure 2:
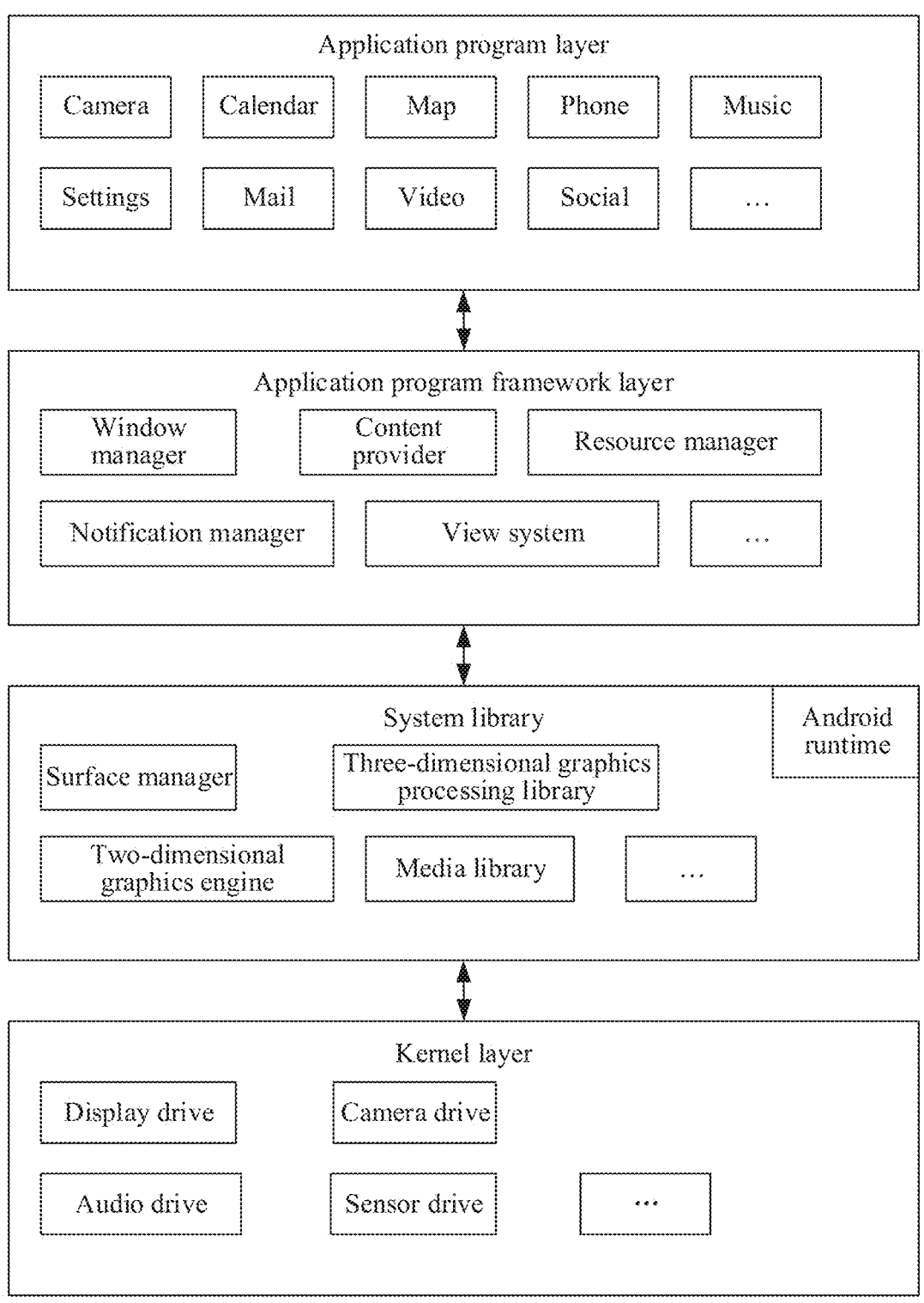
FIG. 2 is a schematic diagram of a structure of a software system of a terminal device according to an embodiment of this application.

For example, FIG. 2 is a block diagram of a software structure of a terminal device 100 according to an embodiment of this application.

In a layered architecture, software is classified into several layers, and each layer has a clear role and task. The layers communicate with each other through a software interface. In some embodiments, an Android system is divided into four layers that are respectively an application program layer, an application program framework layer, an Android runtime and system library, and a kernel layer from top to bottom.

The application program layer may include a series of application program packages. As shown in FIG. 2, the application program packages may include application programs such as camera, gallery, calls, map, calls, music, settings, mail, video, and social.

The application program framework layer provides an application programming interface (API) and a programming framework for an application program at the application program layer. The application program framework layer includes some predefined functions.

As shown in FIG. 2, the application program framework layer may include a window manager, a content provider, a resource manager, a view system, a notification manager, and the like.

The window manager is configured to manage a window program. The window manager may obtain a size of a display screen, determine whether there is a status bar, lock a screen, touch a screen, drag a screen, capture a screen, and the like.

The content provider is configured to store and obtain data and make the data accessible to an application program. The data may include a video, an image, an audio, calls made and answered, a browsing history and bookmarks, an address book, and the like.

The view system includes visual controls such as a control for displaying a text and a control for display an image. The view system may be configured to construct an application program. A display interface may be formed by one or more views. For example, a display interface including an SMS message notification icon may include a view for displaying a text and a view for displaying an image.

The resource manager provides various resources such as a localized character string, an icon, a picture, a layout file, and a video file for an application program.

The notification manager enables an application program to display notification information in the status bar that may be used to convey a message of a notification type, where the message may disappear automatically after a short stay without user interaction. For example, the notification manager is configured to notify download completion, a message prompt, and the like. The notification manager may alternatively display a notification in a form of a chart or a scroll bar text in a status bar at the top of the system, for example, a notification of an application program run in the background, or may display a notification in a form of a dialog window on the screen. For example, text information is prompted on a status bar, a prompt tone is made, the terminal device vibrates, or an indicator light flashes.

The Android runtime includes a core library and a virtual machine. The Android runtime is responsible for scheduling and management of the Android system.

The core library includes two parts: one is a function that needs to be called by a java language, and the other is a core library of Android.

The application program layer and the application program framework layer run on the virtual machine. The virtual machine executes java files of the application program layer and the application program framework layer as binary files. The virtual machine is configured to perform functions such as object lifecycle management, stack management, thread management, security and exception management, and garbage collection.

The system library may include a plurality of function modules, such as a surface manager, a media library, a three-dimensional graphics processing library (for example, OpenGL ES), and a 2D graphics engine (for example, SGL).

The surface manager is configured to manage a display subsystem and provide fusion of 2D and 3D layers for a plurality of application programs.

The media library supports playback and recording in a plurality of commonly used audio and video formats, and static image files. The media library may support a plurality of audio and video encoding formats such as MPEG4, H.264, MP3, AAC, AMR, JPG, and PNG.

The three-dimensional graphics processing library is configured to implement drawing of three-dimensional graphics, image rendering, synthesis, layer processing, and the like.

The 2D graphics engine is a drawing engine for 2D graphics.

The kernel layer is a layer between hardware and software. The kernel layer includes at least a display drive, a camera drive, an audio drive, and a sensor drive.

For example, the following describes working procedures of software and hardware of the terminal device with reference to an interface switching scenario of the terminal device.

When a touch sensor in the terminal device receives a touch operation, a corresponding hardware interrupt is sent to the kernel layer. The kernel layer processes the touch operation into an original input event (including information such as coordinates of a touch, a touch force, and a time stamp of the touch operation). The original input event is stored at the kernel layer. The application program framework layer obtains the original input event from the kernel layer, and recognizes a control corresponding to the input event. Using an example in which the touch operation is a touch/click operation, and a control corresponding to the click operation is a control of a camera application icon. The camera application invokes an interface of the application framework layer to start a camera application, then starts a display drive by invoking the kernel layer, and displays a functional interface of the camera application.

After the camera application is started, the camera application may invoke a camera access interface in the application program framework layer to start a capturing function of the camera, and drive one or more cameras to acquire one or more frames of images in real time based on a camera drive in the kernel layer. After the camera acquires the image, the image may be transmitted to the camera application in real time through the kernel layer, the system library, and the application program framework layer, and then the camera application displays the image to a corresponding functional interface.

The following describes the technical solutions of this application and how to resolve the foregoing technical problems according to the technical solutions of this application in detail by using specific embodiments. The following several specific embodiments may be independently implemented, and may also be combined with each other, and the same or similar concepts or processes may not be described repeatedly in some embodiments.

To improve user experience, a plurality of cameras are usually configured on a terminal device such as a mobile phone or a tablet computer. The terminal device may provide, through a plurality of configured cameras, a plurality of capturing modes for a user, such as a front camera mode, a rear camera mode, a front-rear dual camera mode, and a protagonist mode. The user may select a corresponding capturing mode for capturing based on a capturing scenario.

The protagonist mode may be understood as a mode in which a portrait focusing video may be additionally generated when the terminal device records a video. To be specific, more than two videos are stored when the recording is completed, where one is a recorded original video, and the other video is a video automatically cropped from the original video based on a tracked target portrait. A portrait in the portrait focusing video may be understood as a "protagonist" that the user pays attention to. A method for generating a video corresponding to the "protagonist" may be: cropping video content corresponding to the "protagonist" from a video commonly recorded by the terminal device.

The "protagonist" may be a living organism such as a character or an animal, or a non-living organism such as a vehicle. It may be understood that, any object that may be recognized based on an algorithm model may be used as the "protagonist" in embodiments of this application. In embodiments of this application, the "protagonist" may be defined as a focusing object, and the focusing object may also be referred to as a protagonist object, a tracking target, a tracking object, a focusing target, or the like. A concept of the "protagonist" is not limited in embodiments of this application.

For ease of understanding, the protagonist mode in the capturing modes is described below with reference to the accompanying drawings.

Figure 3A:
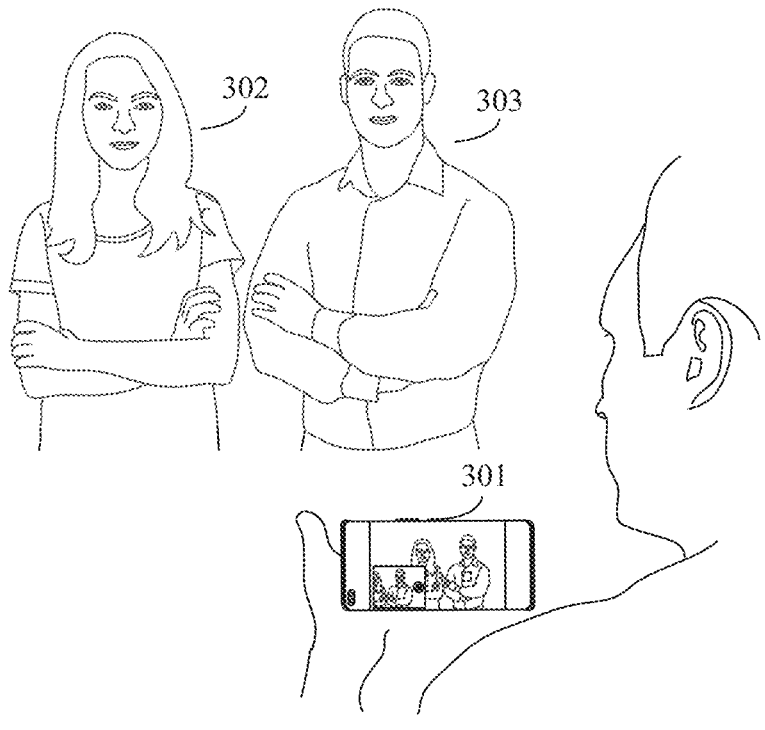
FIG. 3A is a schematic diagram of an application scenario according to an embodiment of this application.

For example, FIG. 3A is a schematic diagram of an application scenario according to an embodiment of this application. As shown in FIG. 3A, the application scenario includes a terminal device 301, a character 302, and a character 303.

The terminal device 301 may record, through a camera, a video including a tracking target. The tracking target may be any character recorded through the camera, or may be any object such as an animal or a vehicle. In the scenario shown in FIG. 3A, the tracking target may be the character 302 in a capturing picture, or may be the character 303 in the capturing picture.

In the protagonist mode, the terminal device may additionally obtain one or more focusing videos corresponding to the tracking target while recording a video.

Specifically, when the terminal device 301 may receive an operation of a user to set the tracking target during previewing through the protagonist mode, the terminal device 301 may additionally generate, after starting to record the video, one or more focusing videos based on the tracking target. For example, the terminal device 301 may set the character 302 in the capturing picture as the tracking target, or may set the character 303 in the capturing picture as the tracking target.

Alternatively, when the terminal device 301 receives the operation of the user to set the tracking target during recording through the protagonist mode, the terminal device 301 may additionally generate one or more focusing videos based on the tracking target. In this way, the focusing video corresponding to the tracking target can be obtained without manual editing on the entire video.

It may be understood that, in a video recording process, the terminal device may perform one or more switching on the character corresponding to the tracking target. Specifically, when the terminal device receives an operation of the user to switch the tracking target, the terminal device switches the character corresponding to the tracking target.

In a possible implementation, when the character corresponding to the tracking target is switched, the focusing video obtained by the terminal device has different characters.

For example, when the terminal device detects, in the recording process, that the user switches the tracking target from the character 302 to the character 303, the terminal device displays a tracking picture based on the character 303. After the recording ends, in the focusing video generated based on the tracking target, the tracking target before the switching is correspondingly displayed as the character 302; and the tracking target after the switching is correspondingly displayed as the character 303. It may also be understood that, the tracking target before the switching corresponds to the character 302, and the tracking target after the switching corresponds to the character 303.

Specifically, an example in which the terminal device detects, at a 3rd second in a recording process of the focusing video, that the user switches the tracking target from the character 302 to the character 303 is used. In the focusing video generated based on the tracking target, the character 302 is displayed in the focusing video before the 3rd second; and the character 303 is displayed in the focusing video after the 3rd second. In this way, the terminal device may switch the tracking target, to implement switching of characters in the focusing video, thereby improving user experience.

In another possible implementation, when the character corresponding to the tracking target is switched, the terminal device may obtain a focusing video based on the tracking target before the switching, and obtain another focusing video based on the tracking target after the switching.

For example, when the terminal device detects, in the recording process, that the user switches the tracking target from the character 302 to the character 303, the terminal device generates a focusing video 1 based on the character 302, and generates a focusing video 2 based on the character 303 after the tracking target is switched to the character 303.

In some embodiments, in a video recording process, the terminal device may alternatively start and end recording a focusing video a plurality of times, to additionally generate a plurality of focusing videos.

For example, in a recording process of a video 1, when the terminal device receives an operation of the user to end tracking the character 303, the terminal device may generate a focusing video 2 based on the character 303. When the terminal device receives an operation of the user to track the character 302 after the operation of ending tracking the character 303, the terminal device 301 may additionally generate a focusing video 3 based on the character 302. In this case, in addition to the video 1 obtained through normal recording, the terminal device additionally generates two focusing videos (namely, the focusing video 2 and the focusing video 3). A quantity of focusing videos is not limited in this embodiment of this application.

In this way, the terminal device can start and end recording a focusing video a plurality of times, and generate a plurality of focusing videos based on the tracking target, thereby improving user experience.

It should be noted that, in the scenario shown in FIG. 3A, the video recorded by the terminal device through the camera includes two characters. The video of the terminal device may include more or less characters. A quantity of characters recorded by the terminal device is not specifically limited in this embodiment of this application.

It should be noted that, when the terminal device has not received the operation of the user to set the tracking target during previewing and recording through the protagonist mode, the terminal device may obtain a video when ending recording. When the terminal device receives an operation of the user to close a small window after receiving the operation of the user to set the tracking target during previewing through the protagonist mode, the terminal device cancels tracking the tracking target. If the operation of the user to set the tracking target is not received during recording, the terminal device may obtain a video when ending recording. It may be understood that, the protagonist mode may be set in an application having a capturing function such as a camera. After the terminal device enters the protagonist mode, implementation of the protagonist mode may include a preview mode and a recording mode.

It should be noted that, interfaces displayed by the terminal device in the preview mode (before recording) and the recording mode (during recording) each may be referred to as preview interfaces; pictures displayed in a preview interface in the preview mode (before recording) are not for generating a video and storing; and pictures displayed in a preview interface in the recording mode (during recording) may be for generating a video and storing. For ease of distinguishing, in the following description, a preview interface in the preview mode (before recording) is referred to as a preview interface; and a preview interface in the recording mode (during recording) is referred to as a recording interface.

In the preview mode of the protagonist mode, the terminal device may display an image (a preview picture) obtained through the camera in a preview region, and display an image (a tracking picture) of the tracking target selected by the user in the small window. In the preview mode, the terminal device may not generate a video, or may not store content displayed in the preview region and content displayed in the small window.

Figure 3B:
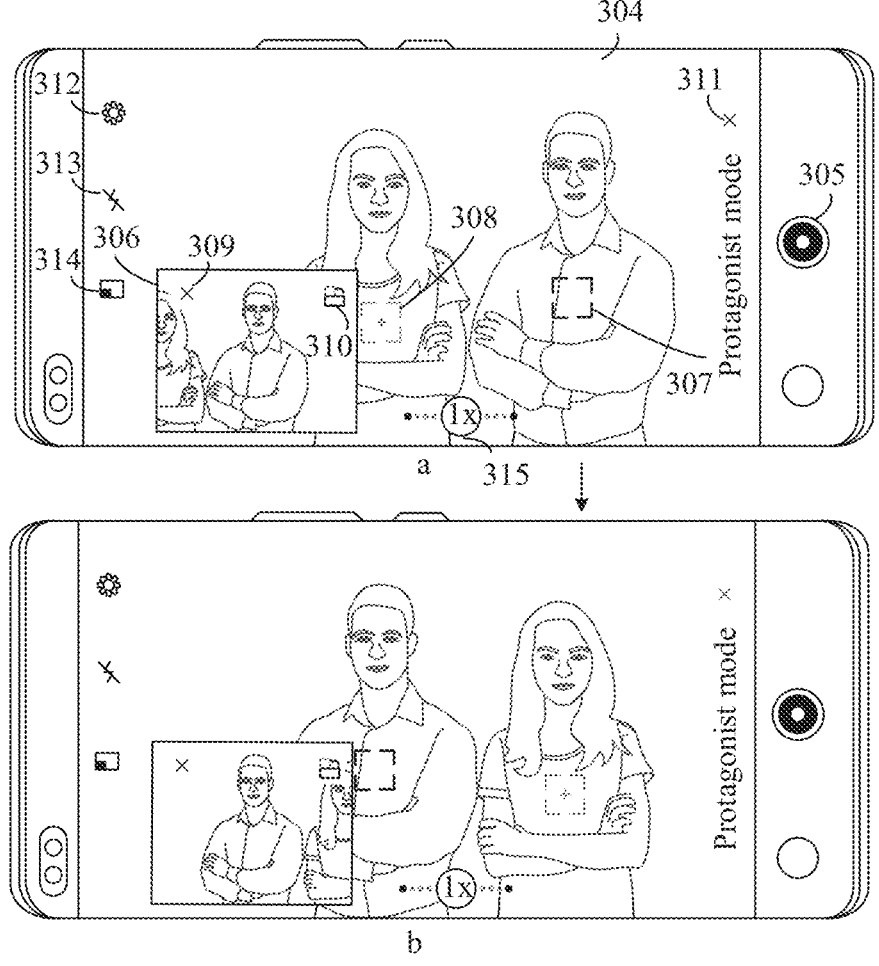
FIG. 3B is a schematic diagram of a preview interface of a protagonist mode according to an embodiment of this application.

For example, the preview interface of the protagonist mode in the terminal device may be shown in FIG. 3B. The preview interface includes a preview region 304 and a recording control 305.

A preview picture is displayed in the preview region 304. When the terminal device recognizes that the preview picture includes a character, a tracking box (for example, a tracking box 307 and a tracking box 308) is displayed in the preview region. The tracking box can prompt the user that a corresponding character can be set or switched to the tracking target, and can also facilitate the user to set or switch the tracking target. When the terminal device recognizes that the preview picture includes a plurality of characters, a plurality of tracking boxes may be displayed in the preview region. A quantity of tracking boxes is less than or equal to a quantity of characters recognized by the terminal device. The tracking target is any one of a plurality of characters corresponding to tracking boxes in the preview picture. The tracking target may be referred to as a focusing object, a protagonist object, or the like, which is not limited in this embodiment of this application.

In some embodiments, a tracking box (for example, the tracking box 307) corresponding to a character set as the tracking target and a tracking box (for example, the tracking box 308) corresponding to a character not set as the tracking target have different display patterns. In this way, the user can distinguish and recognize the tracked character (the tracking target). In addition to different patterns of tracking boxes, colors of the tracking boxes may also be set in this embodiment of this application. For example, the tracking box 307 and the tracking box 308 have different colors. In this way, the tracking target and other characters can be intuitively distinguished. The tracking box may be a dashed box, for example, the tracking box 307; or may be a combination of a dashed box and "+", for example, the tracking box 308. The tracking box may alternatively be in any display form, as long as the tracking box can meet a function that the tracking box can be triggered by the user to implement tracking and can be set as the tracking target. The tracking box may be marked at any position of a character that can be set as the tracking target, which is not specifically limited in this embodiment of this application.

It may be understood that, the tracking box is a tracking identity, and the terminal device may alternatively display a tracking identity in another form, to facilitate the user to set the tracking target. For example, the tracking identity in another form may be a thumbnail of an object, a number, a letter, a graphic, or the like. In addition, the tracking identity may be set at any position of the object, or near the object, or at an edge of the preview region. A specific position of the tracking identity is not specifically limited in this embodiment of this application.

For example, the terminal device may arrange and display thumbnails of one or more objects at an edge of the preview region. When the terminal device receives an operation of the user to click on any tracking identity, an object corresponding to the tracking identity that is clicked on is set as the tracking target.

In a possible implementation, the terminal device may recognize a character through a face recognition technology, and display a tracking box. The terminal device may determine a display position of the tracking box based on a technology such as human body recognition, for example, a more central position of the character's body. In this way, by calculating the position of the tracking box based on a human body, a situation in which the tracking box is located on a face can be reduced, and occlusion of the face by the tracking box can be reduced, thereby improving user experience. Technologies used to recognize the character and calculate the position of the tracking box are not specifically limited in this embodiment of this application.

In some embodiments, FIG. 3B further includes a small window 306. A tracking picture is displayed in the small window 306. The tracking picture corresponds to the tracking target. When the tracking target is switched, a character in the tracking picture displayed in the small window 306 is switched. For example, if the tracking target is switched from the character corresponding to the tracking box 307 to the character corresponding to the tracking box 308, the tracking picture displayed in the small window 306 also changes correspondingly.

The tracking picture may be a part of the preview picture. In a possible implementation, the tracking picture is obtained by the terminal device cropping the preview picture in real time based on a specified proportion and the tracking target. The picture displayed in the small window is not specifically limited in this embodiment of this application.

In some embodiments, a specification, a position, and a landscape/portrait display manner of the small window are adjustable, and the user can adjust a pattern of the small window based on a video recording habit.

Optionally, the tracking target is displayed in the center of the tracking picture.

Optionally, the small window floats above the recording region, which is not limited herein.

In some embodiments, the small window 306 further includes a close control 309 and a first switching control 310.

It may be understood that, after the terminal device receives the operation of the user to set the tracking target, the small window is displayed in the preview interface, to display the tracking picture of the tracking target. When the terminal device has not received the operation of the user to set the tracking target, the small window is not displayed in the preview interface.

When the user triggers the close control 309 through an operation such as clicking or touching in the preview interface shown in FIG. 3B, the terminal device receives an operation of closing the small window, and the terminal device closes the small window and cancels previewing the tracking target.

When the user triggers the first switching control 310 through an operation such as clicking or touching in the preview interface shown in FIG. 3B, the terminal device receives an operation of switching a display manner of the small window (a pattern of the small window), and the terminal device switches the pattern of the small window. Specifically, the small window may be switched from a horizontal state to a vertical state, or from the vertical state to the horizontal state.

When the user triggers the recording control 305 through an operation such as clicking or touching in the preview interface shown in FIG. 3B, the terminal device receives an operation of starting to record, and starts to record a video and a focusing video.

Optionally, the preview interface may further include other controls, such as a protagonist mode exit control 311, a setting control 312, a flash control 313, a second switching control 314, and a zoom control 315.

When the protagonist mode exit control 311 is triggered, the terminal device exits the protagonist mode and enters the recording mode. When the setting control 312 is triggered, the terminal device may adjust various setting parameters. The setting parameters include, but not limited to: whether to turn on a watermark, a storage path, an encoding manner, whether to store a geographical position, and the like. When the flash control 313 is triggered, the terminal device may set a flash effect, for example, control the flash to be forced on, forced off, turned on when photographing, turned on based on environmental adaptability, and the like. When the zoom control 315 is triggered, the terminal device may adjust a focal length of the camera, to adjust a magnification of the preview picture.

When the user triggers the second switching control 314 through an operation such as clicking or touching in the preview interface shown in FIG. 3B, the terminal device receives an operation of setting a pattern of the small window, and displays a small window pattern option for selection of the user. The small window pattern option includes, but not limited to: a horizontal state, a vertical state, or the like. This is not limited in this embodiment of this application. In a possible implementation, the second switching control 314 corresponds to the display pattern of the small window, to facilitate the user to distinguish the pattern of the small window.

It should be noted that, in the preview interface shown in FIG. 3B, switching of the pattern of the small window may be controlled through the first switching control 310, or switching of the pattern of the small window may be controlled through the second switching control 314. In a possible implementation, the first switching control 310 in the small window and the second switching control 314 in the preview region may be linked. For example, when the small window is switched from the horizontal state to the vertical state, an icon of the first switching control 310 is a pattern during vertical previewing, and an icon of the second switching control 314 is also a pattern during vertical previewing, or the icons of the first switching control 310 and the second switching control 314 are both patterns during horizontal previewing, to prompt the user to click on again a preview pattern after the switching.

It may be understood that, in a preview scenario, after the terminal device sets the tracking target, the tracking target may be displayed in the center of a tracking picture of the small window. In some scenarios, the tracking target may be in a moving state. When the tracking target moves but does not leave the camera, the tracking target may be continuously displayed in the center of the tracking picture of the small window.

For example, in the preview interface, it may be set that tracking target objects include a male character and a female character. In response to a click operation of the user for a tracking box of the male character, the terminal device sets the male character as the tracking target and enters an interface shown in a of FIG. 3B. In the interface shown in a of FIG. 3B, the male character is displayed in the center of the tracking picture of the small window, and the male character is located on a right side of the female character. When the male character moves, the terminal device may continuously focus the male character, and display the male character in the center of the small window. When the male character moves to a left side of the female character, the interface of the terminal device may be shown in b of FIG. 3B. In the interface shown in b of FIG. 3B, the male character is still displayed in the center of the tracking picture of the small window, and the male character is located on the left side of the female character.

In a possible implementation, when the terminal device tracks a target, a focus moves with the tracking target. For example, in the interface shown in a of FIG. 3B, the focus is located on a face region of the male character, and is located in a right part of the middle of the picture. When the male character moves, the terminal device may continuously focus the male character. When the male character moves to the left side of the female character, the interface of the terminal device may be shown in b of FIG. 3B. In the interface shown in b of FIG. 3B, the focus is located on the face region of the male character, and is located in a left part of the middle of the picture.

In the recording mode of the protagonist mode, the terminal device may display an image (a recording picture) obtained through the camera in a recording region, display an image (a tracking picture) of the tracking target selected by the user in the small window, and generate a recorded video and a focusing video obtained through recording after the recording mode is turned on. When ending recording, the terminal device stores a video generated based on the recording picture and a focusing video generated based on the tracking picture.

In some embodiments, compared with recording of the recording region, recording of the small window may be ended in advance. When ending recording of the small window, the terminal device stores a focusing video generated based on the tracking picture. Alternatively, it may be understood that, compared with the entire video, the terminal device may end recording a focusing video in advance.

In some embodiments, compared with recording of the recording region, recording of the small window may be delayed to be started. Alternatively, it may be understood that, when the terminal device detects the operation of the user to set the tracking target after starting to record a video, the terminal device turns on the small window, and starts to record a focusing video.

Figure 3C:
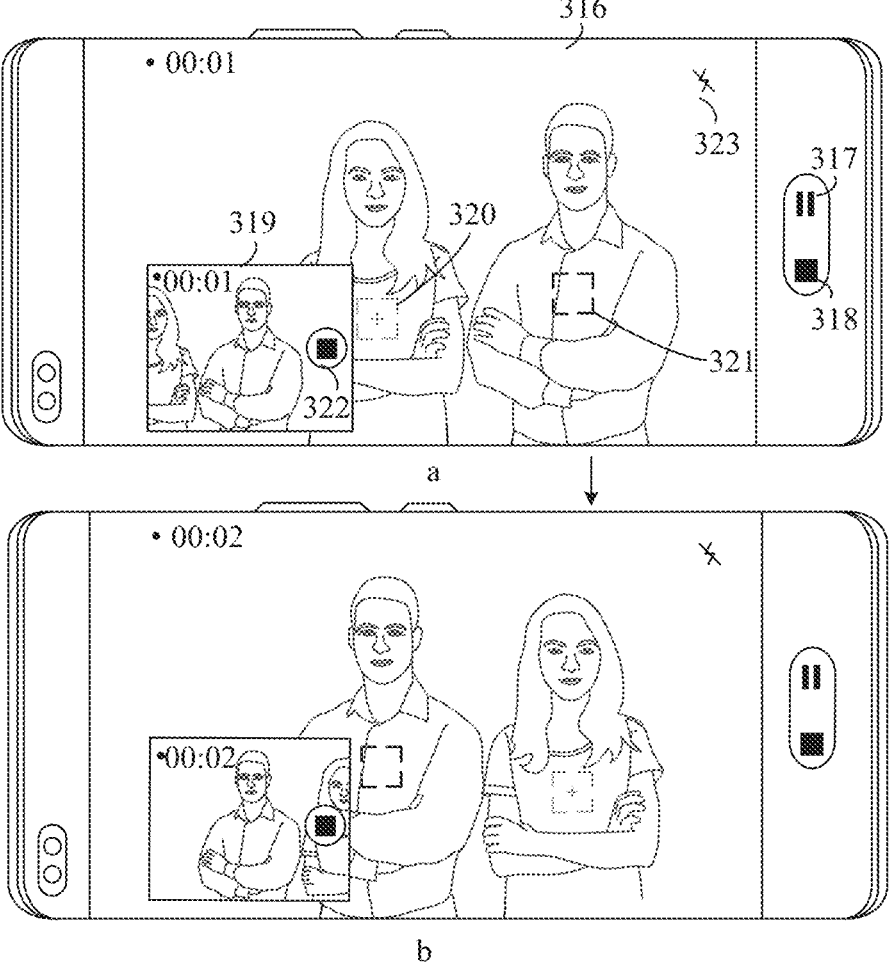
FIG. 3C is a schematic diagram of a recording interface of a protagonist mode according to an embodiment of this application.

For example, the recording interface of the protagonist mode in the terminal device may be shown in FIG. 3C. The recording interface includes a recording region 316, a pause control 317, and an end control 318.

A recording picture and recording duration are displayed in the recording region 316. When the terminal device recognizes that the recording picture includes a character, a tracking box (for example, a tracking box 320 and a tracking box 321) is displayed in the recording region. It may be understood that, a quantity of tracking boxes is less than or equal to a quantity of characters recognized by the terminal device.

In some embodiments, a small window 319 is further displayed in the recording interface. A tracking picture is displayed in the small window 319. The tracking picture corresponds to the tracking target. When the tracking target is switched, a character in the tracking picture displayed in the small window 319 is switched. For example, if the tracking target is switched from the character corresponding to the tracking box 320 to the character corresponding to the tracking box 321, the tracking picture displayed in the small window 319 also changes correspondingly.

The tracking picture may be a part of the recording picture. In a possible implementation, the tracking picture is obtained by cropping the recording picture in real time based on a specified proportion and the tracking target. The picture displayed in the small window is not specifically limited in this embodiment of this application.

Optionally, the tracking target is displayed in the center of the tracking picture.

Optionally, the small window floats above the recording region, which is not limited herein.

The small window 319 further includes a small window end control 322 and small window recording duration.

It may be understood that, after the terminal device receives the operation of the user to set the tracking target, the small window is displayed in the recording interface, to display the tracking picture of the tracking target. When the terminal device has not received the operation of the user to set the tracking target, the small window is not displayed in the recording interface.

When the user triggers the end control 318 through an operation such as clicking or touching in the recording interface shown in FIG. 3C, the terminal device receives an operation of the user to end recording; and the terminal device enters the preview interface of the protagonist mode, and stores a video corresponding to the recording picture and a focusing video corresponding to the tracking picture.

When the user triggers the pause control 317 through an operation such as clicking or touching in the recording interface shown in FIG. 3C, the terminal device receives an operation of the user to pause recording, and the terminal device pauses recording a video in the recording region 316 and recording a focusing video in the small window 319.

When the user triggers the small window end control 322 through an operation such as clicking or touching in the recording interface shown in FIG. 3C, the terminal device receives an operation of the user to end recording the small window; and the terminal device continues to display the recording picture in the recording region 316, and closes the small window 319 and stores a focusing video corresponding to the tracking picture in the small window 319.

In a possible implementation, the recording interface further includes a flash control 323. When the flash control 323 is triggered, the terminal device may set a flash effect.

It may be understood that, during recording through the protagonist mode, the terminal device may generate a video based on the recording picture of the recording region, and additionally generate a focusing video corresponding to the tracking target based on a tracking picture of the small window. The two videos are independently stored in the terminal device. In this way, the video corresponding to the tracking target can be obtained without subsequent manual editing on the entire video, and the operation is simple and convenient, thereby improving user experience.

It may be understood that, in a recording scenario, after the terminal device sets the tracking target, the tracking target may be displayed in the center of the tracking picture of the small window. In some scenarios, the tracking target may be in a moving state. When the tracking target moves but does not leave the camera, the tracking target may be continuously displayed in the center of the tracking picture of the small window.

For example, in the preview interface, it may be set that tracking target objects include a male character and a female character. In response to a click operation of the user for a tracking box of the male character, the terminal device sets the male character as the tracking target and enters an interface shown in a of FIG. 3C. In the interface shown in a of FIG. 3C, the male character is displayed in the center of the tracking picture of the small window, and the male character is located on a right side of the female character. When the male character moves, the terminal device may continuously focus the male character, and display the male character in the center of the small window. When the male character moves to a left side of the female character, the interface of the terminal device may be shown in b of FIG. 3C. In the interface shown in b of FIG. 3C, the male character is still displayed in the center of the tracking picture of the small window, and the male character is located on the left side of the female character.

In a possible implementation, when the terminal device tracks a target, a focus moves with the tracking target. For example, in the interface shown in a of FIG. 3C, the focus is located on a face region of the male character, and is located in a right part of the middle of the picture. When the male character moves, the terminal device may continuously focus the male character. When the male character moves to the left side of the female character, the interface of the terminal device may be shown in b of FIG. 3C. In the interface shown in b of FIG. 3C, the focus is located on the face region of the male character, and is located in a left part of the middle of the picture.

It may be understood that, in embodiments of this application, a capturing mode in which one or more focusing videos may be additionally generated based on a tracking target is defined as a protagonist mode, and the capturing mode may also be referred to as a focusing mode or the like. This is not limited in this embodiment of this application.

Figure 4:
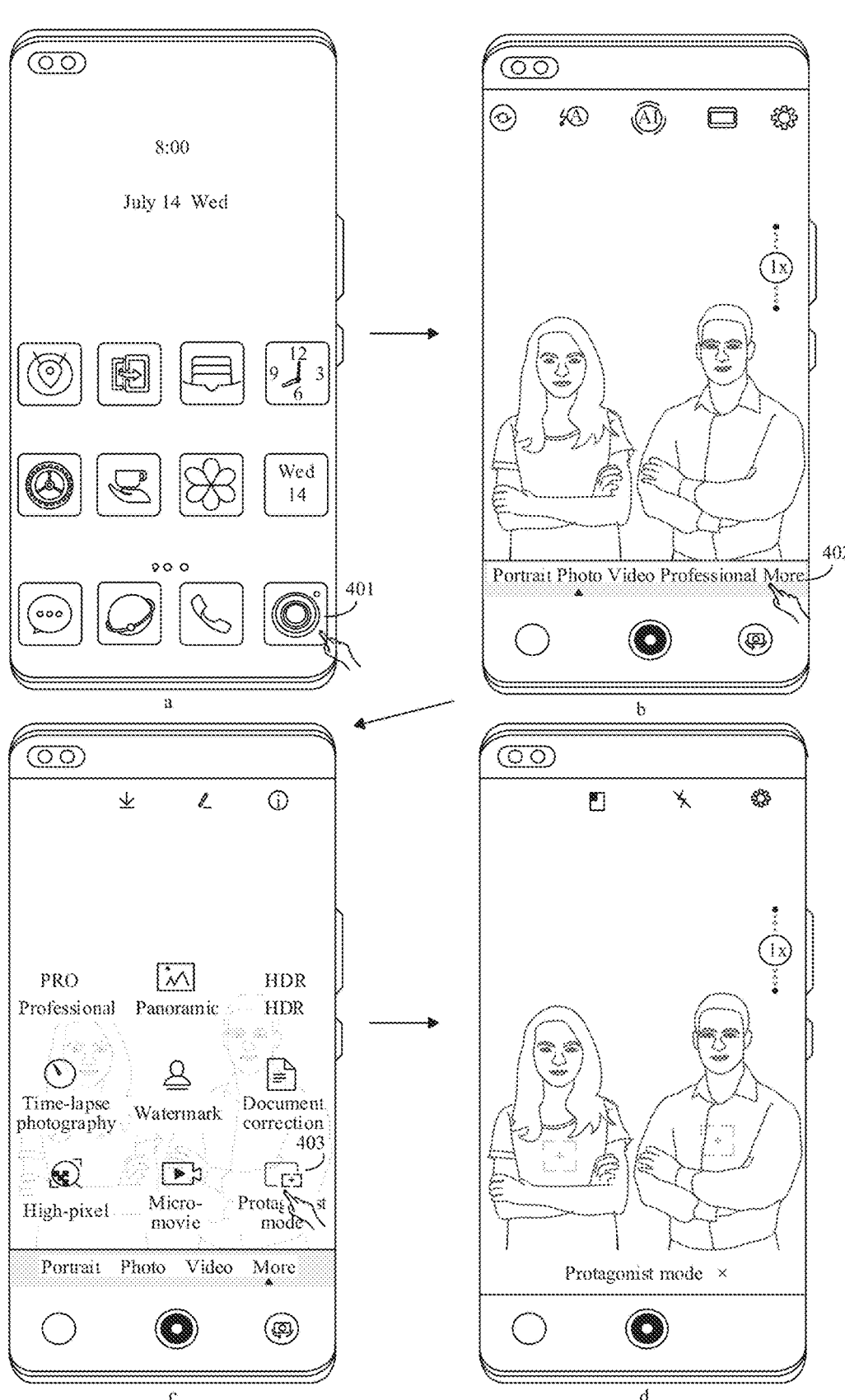
FIG. 4 is a schematic diagram of an interface in which a terminal device enters a protagonist mode according to an embodiment of this application.
Figure 5:
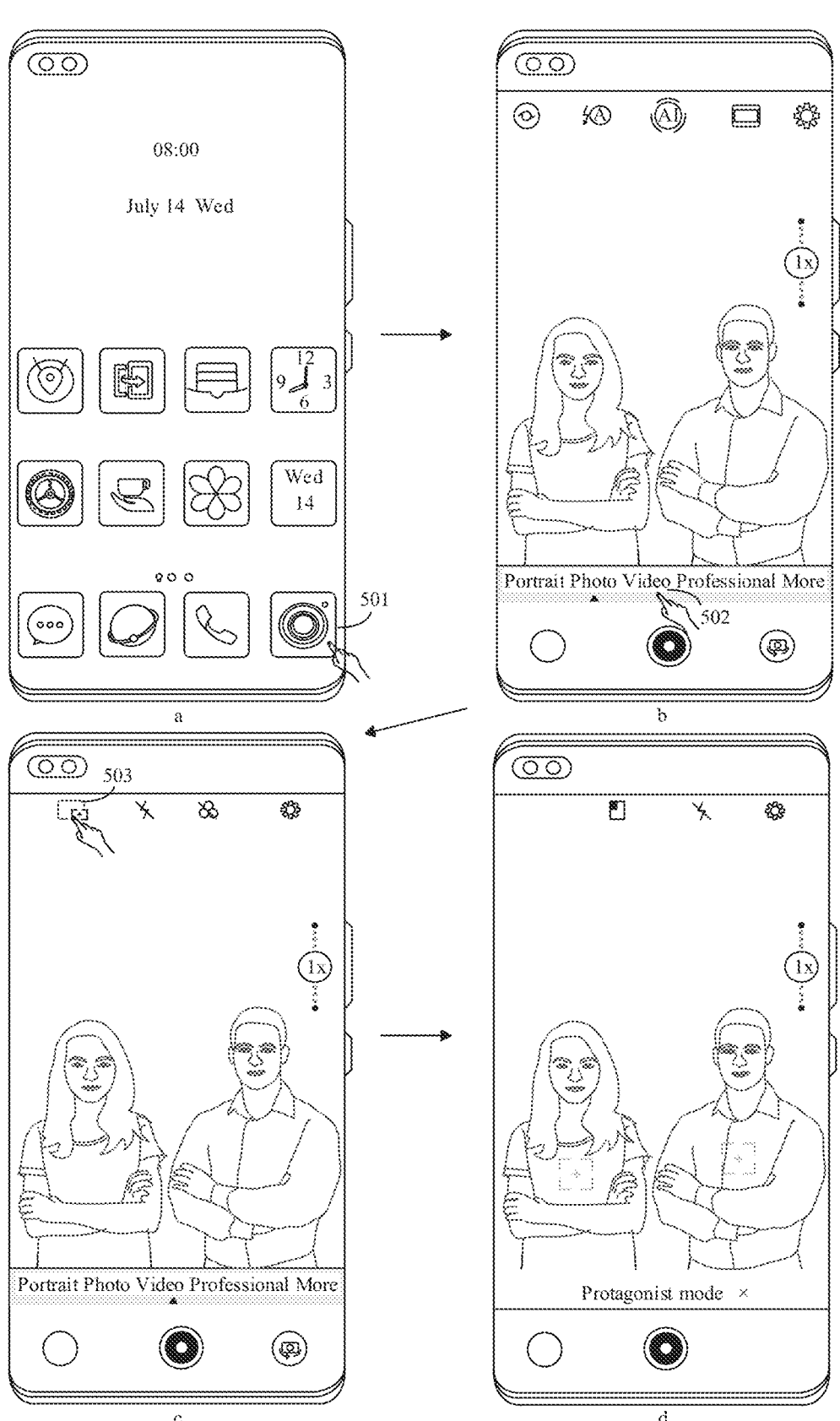
FIG. 5 is a schematic diagram of an interface in which a terminal device enters a protagonist mode according to an embodiment of this application.
Figure 6:
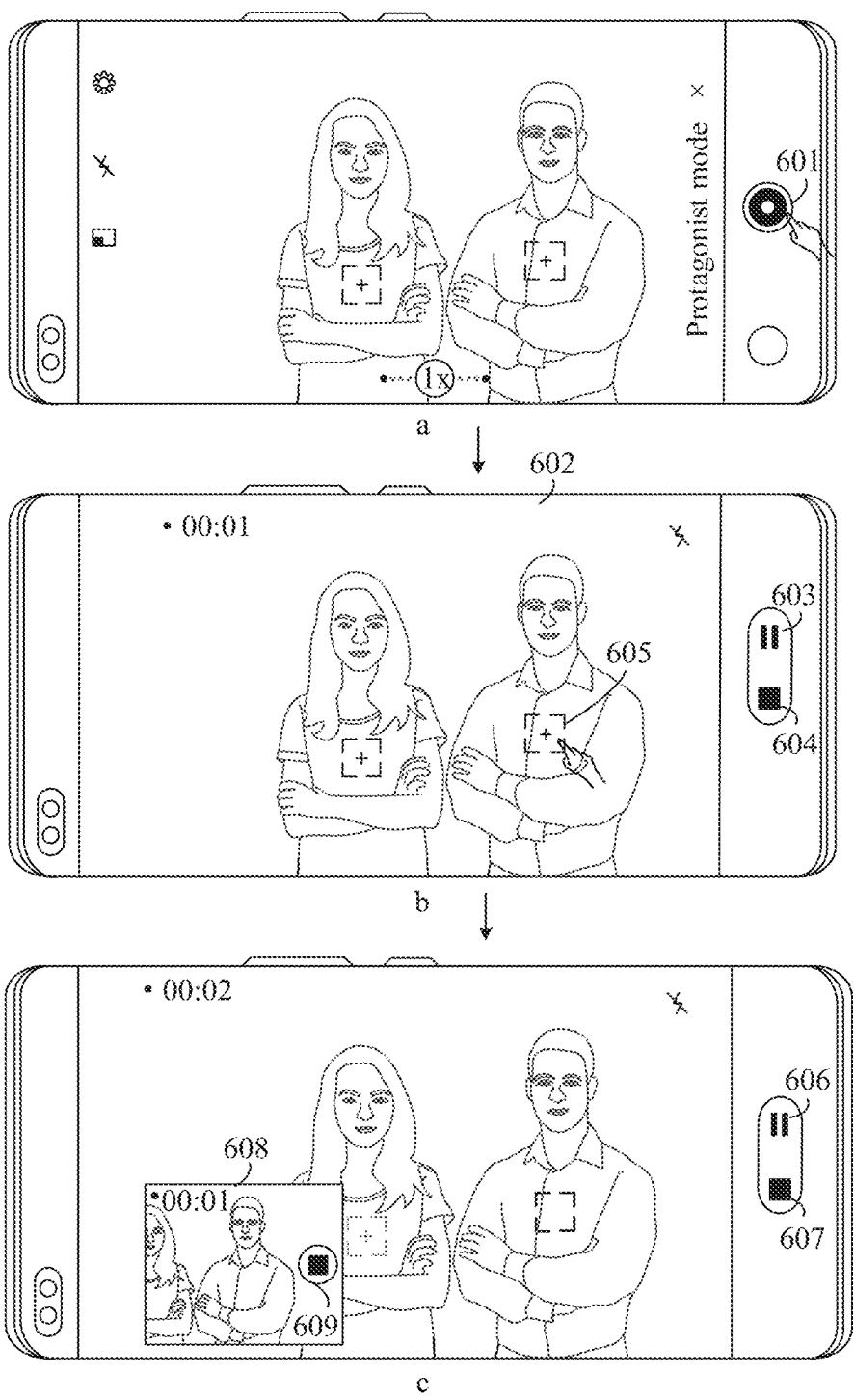
FIG. 6 is a schematic diagram of an interface corresponding to a recording procedure of a protagonist mode according to an embodiment of this application.
Figure 7:
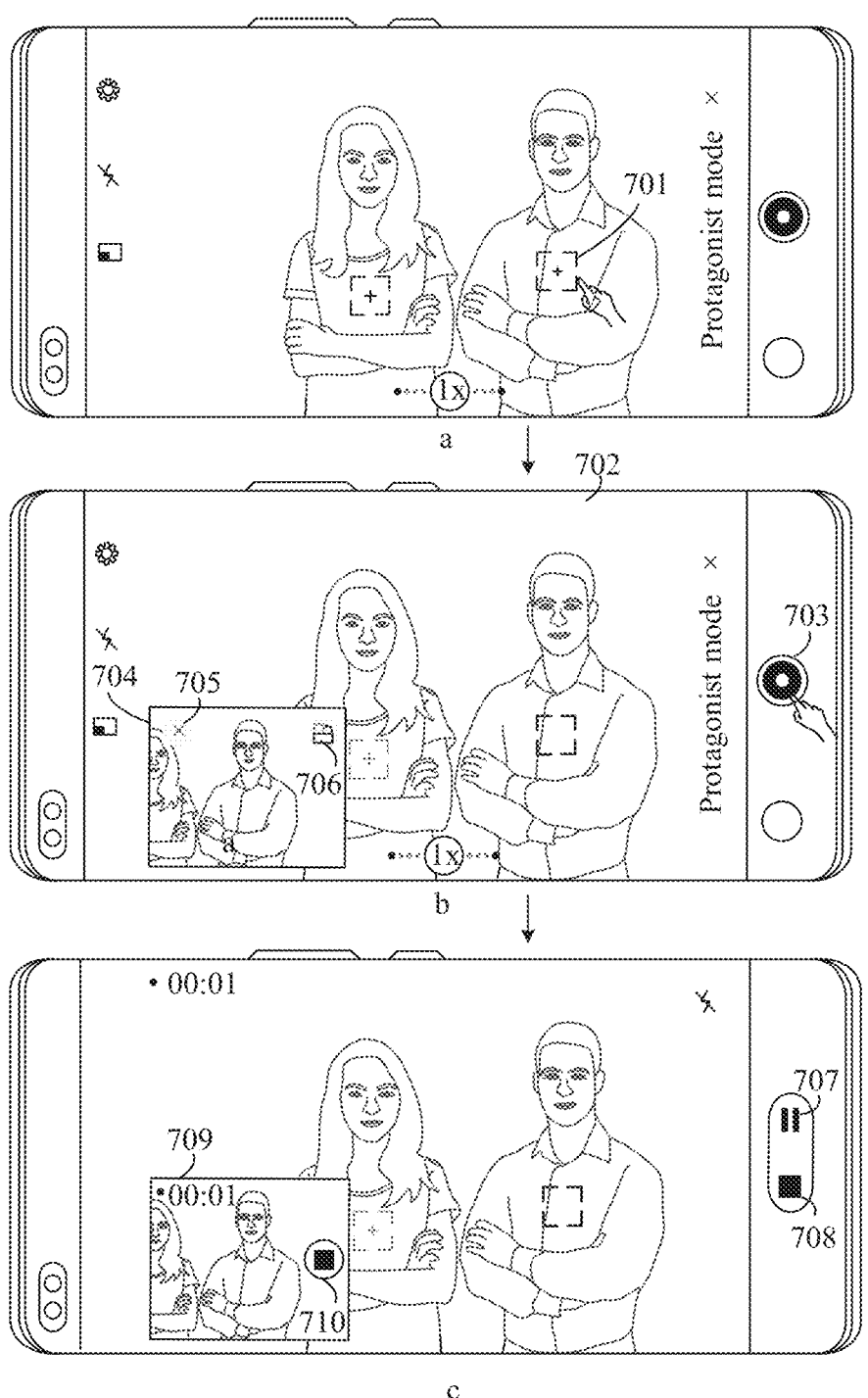
FIG. 7 is a schematic diagram of an interface corresponding to a recording procedure of a protagonist mode according to an embodiment of this application.

The following describes an entering manner of the protagonist mode in the terminal device and interfaces involved in recording with reference to FIG. 4 to FIG. 7. FIG. 4 and FIG. 5 are two schematic flowcharts of entering a protagonist mode according to an embodiment of this application. FIG. 6 and FIG. 7 are schematic diagrams of interfaces involved in recording according to an embodiment of this application.

For example, FIG. 4 is a schematic diagram of an interface in which a terminal device enters a protagonist mode according to an embodiment of this application.

When the terminal device receives an operation of a user to start a camera application program 401 in a main interface shown in a of FIG. 4, the terminal device may enter a photographing preview interface shown in b of FIG. 4. The photographing preview interface may include a preview region and a capturing mode option. A preview picture is displayed in the preview region in real time. The capturing mode option includes, but not limited to: portrait, photo, video, professional, or more 402.

When the user triggers the more 402 through an operation such as clicking or touching in a camera preview interface shown in b of FIG. 4, the terminal device receives an operation of the user to view a capturing mode of another type, and enters a capturing mode selection interface shown in c of FIG. 4. The capturing mode selection interface includes a capturing mode option. The capturing mode option includes, but not limited to: professional, panoramic, high-dynamic-range (HDR) image, time-lapse photography, watermark, document correction, high-pixel, micro-movie, a protagonist mode 403, or a capturing mode option of another type.

When the user triggers the protagonist mode 403 through an operation such as clicking or touching in the capturing mode selection interface shown in c of FIG. 4, the terminal device receives an operation of the user to select to preview the protagonist mode, and enters a preview interface corresponding to the protagonist mode shown in d of FIG. 4. The preview interface includes a preview region and a recording control. A preview picture is displayed in the preview region. When the preview picture includes a character, a tracking box is further displayed in the preview region. When the user triggers the tracking box through a click or touch operation, the terminal device receives an operation of setting a tracking target, sets the character corresponding to the tracking box as the tracking target, and displays, through a small window, a tracking picture corresponding to the tracking target in a display interface.

For example, FIG. 5 is another schematic diagram of an interface in which a terminal device enters a protagonist mode according to an embodiment of this application.

When the terminal device receives an operation of a user to start a camera application program 501 in a main interface shown in a of FIG. 5, the terminal device may enter a photographing preview interface shown in b of FIG. 5. The photographing preview interface may include a preview region and a capturing mode option. A preview picture is displayed in the preview region in real time. The capturing mode option includes, but not limited to: portrait, photo, video 502, professional, or a capturing mode option of another type.

When the user triggers the video 502 through an operation such as clicking or touching in a camera preview interface shown in b of FIG. 5, the terminal device receives an operation of the user to select to preview the video, and enters a video preview interface shown in c of FIG. 5. The video preview interface includes a preview region, a recording parameter option, and a capturing mode option. A preview picture is displayed in the preview region in real time. The recording parameter option includes, but not limited to: a protagonist mode 503, a flash, filters, settings, or a recording parameter option of another type. The capturing mode option includes, but not limited to: portrait, photo, video, professional, or a capturing mode option of another type.

When the user triggers the protagonist mode 503 through an operation such as clicking or touching in the video preview interface in c of FIG. 5, the terminal device receives an operation of the user to select to preview the protagonist mode, and enters a preview interface corresponding to the protagonist mode shown in d of FIG. 5. The preview interface includes a preview region and a recording control. A preview picture is displayed in the preview region. When the preview picture includes a character, a tracking box is further displayed in the preview region. When the user triggers the tracking box through a click or touch, the terminal device receives an operation of setting a tracking target, sets the character corresponding to the tracking box as the tracking target, and displays, through a small window, a tracking picture corresponding to the tracking target in a display interface.

It may be understood that, when the terminal device enters the protagonist mode, the terminal device may be placed horizontally in a landscape state, or may be placed vertically in a portrait state. In the landscape state or the portrait state, a principle of the terminal device implementing the protagonist mode is similar. In the following embodiments, an example in which the terminal device performs landscape recording is used to describe a plurality of application scenarios of the protagonist mode.

It may be understood that, in the protagonist mode of the camera, the terminal device may select a tracking target after starting to record, or may select a tracking target before starting to record a video. Two recording procedures are respectively described below with reference to FIG. 6 and FIG. 7. For example, FIG. 6 is a schematic diagram of an interface corresponding to a recording procedure of a protagonist mode according to an embodiment of this application.

When the user triggers a recording control 601 through an operation such as clicking or touching in a preview interface shown in a of FIG. 6, the terminal device receives an operation of starting to record, and enters a recording interface shown in b of FIG. 6. The recording interface includes a recording region 602, a pause control 603, and an end control 604. A recording picture and a tracking box 605 are displayed in the recording region. The tracking box 605 can facilitate the user to select a tracking target.

When the user triggers a tracking box 605 through an operation such as clicking or touching in the recording interface shown in b of FIG. 6, the terminal device receives an operation of the user to set the tracking target, and the terminal device enters a recording interface shown in c of FIG. 6. The recording interface includes a recording region, a pause control 606, an end control 607, and a small window 608. A recording picture is displayed in the recording region. The small window 608 includes a small window end control 609. A tracking picture corresponding to the tracking target is displayed in the small window 608. The tracking picture corresponding to the tracking target is a part of the recording picture.

Based on the procedure shown in FIG. 6, when the user triggers the pause control 606 through an operation such as clicking or touching in the recording interface shown in c of FIG. 6, the terminal device receives an operation of pausing recording a video; and recording of the video is paused, and recording of a focusing video corresponding to the small window is also paused.

When the user triggers the end control 607 through an operation such as clicking or touching in the recording interface shown in c of FIG. 6, the terminal device receives an operation of end recording a video; and recording of the video is ended, and recording of a focusing video corresponding to the small window is also ended.

When the user triggers the small window end control 609 through an operation such as clicking or touching in the recording interface shown in c of FIG. 6, the terminal device receives an operation of ending recording a focusing video; and recording of the focusing video corresponding to the small window is ended, and recording of a video is continued.

When the user triggers the small window 608 through a drag operation in the recording interface shown in c of FIG. 6, a position of the small window 608 is movable.

A movement distance of the small window 608 is related to a distance between a start position of the drag operation and an end position of the drag operation, and a movement direction of small window 608 is related to a direction of the drag operation.

For example, FIG. 7 is a schematic diagram of an interface corresponding to a recording procedure of a protagonist mode according to an embodiment of this application.

When the user triggers a tracking box 701 through an operation such as clicking or touching in a preview interface shown in a of FIG. 7, the terminal device receives an operation of the user to set a tracking target, and enters a preview interface shown in b of FIG. 7. The preview interface includes a preview region 702, a recording control 703, and a small window 704. A preview picture is displayed in the recording region. A tracking picture is displayed in the small window 704. The tracking picture corresponds to the tracking target. The small window 704 further includes a close control 705 and a first switching control 706.

When the user triggers the recording control 703 through an operation such as clicking or touching in the preview interface shown in b of FIG. 7, the terminal device receives an operation of starting to record, and enters a recording interface shown in c of FIG. 7. The recording interface includes a recording region, a pause control 707, an end control 708, and a small window 709. A recording picture is displayed in the recording region. The small window 709 includes a small window end control 710. A tracking picture is displayed in the small window 709. The tracking picture corresponds to the tracking target. The tracking picture is a part of the recording picture.

For action of the pause control 707, the end control 708, and the small window 709, refer to related description in FIG. 6. Details are not described herein again.

Based on the procedure shown in FIG. 7, when the user triggers the close control 705 through an operation such as clicking or touching in the preview interface shown in b of FIG. 7, the terminal device receives an operation of closing the small window, and the terminal device closes the small window and cancels previewing the tracking target.

When the user triggers the first switching control 706 through an operation such as clicking or touching in the preview interface shown in b of FIG. 7, the terminal device receives an operation of switching a display manner of the small window, and the terminal device switches the display manner of the small window. Specifically, the small window may be switched from a horizontal state to a vertical state, or from the vertical state to the horizontal state.

In some possible implementations, the terminal device may further adjust a size of the small window. A specific implementation for adjusting the size of the small window is not limited in this embodiment of this application.

The terminal device may start to record a focusing video in the small window based on the foregoing scenarios, and obtain a plurality of videos. It should be noted that, a picture related to the tracking target in the preview region/recording region may be displayed in the small window. However, a video recorded in the small window and a video recorded in the recording region are a plurality of independent videos, rather than a picture-in-picture composite video in which the tracking picture in the small window is nested in the recording picture of the recording region.

It should be noted that, if the terminal device does not start recording of the small window, the terminal device may obtain a video recorded in the recording region. If the terminal device starts recording of the small window, the terminal device may obtain a video recorded in the recording region and one or more videos recorded in the small window. For example, during recording a video in the recording region, the terminal device may start recording of the small window a plurality of times. When the terminal device detects a click operation for the small window end control, the terminal device may end recording of the small window, and obtain a video. After recording of the small window is started again, the terminal device may obtain a new video. A quantity of videos obtained by the terminal device based on the small window may be related to a quantity of times that recording of the small window is started.

Optionally, the user may browse the video recorded in the recording region and a plurality of videos recorded in the small window based on a gallery of the camera application. Display order of the plurality of videos may be recording order of the videos, that is, the terminal device may sort the videos based on end time points or start time points of the recorded videos. Optionally, the display order of the plurality of videos may alternatively be reverse recording order of the videos, that is, the terminal device may sort the videos in reverse order based on end time or start time of the recorded videos.

Optionally, the video recorded in the recording region and the video recorded in the small window may be displayed in video thumbnails on a same gallery interface. For ease of distinguishing the video recorded in the recording region and the video recorded in the small window, the terminal device may set an identity for the video recorded in the small window. For example, the terminal device may add an outer border, font, graphics, or the like for the video recorded in the small window. The terminal device may also set a size of a thumbnail of the video recorded in the small window, so that there is a size difference between the thumbnail of the video recorded in the small window and a thumbnail of the video recorded in the recording region. It may be understood that, forms of thumbnails of videos, sorting order of the thumbnails of the videos, storage order of the videos, and the like in the gallery are not limited in this embodiment of this application.

It may be understood that, the terminal device may display an interface including a tracking box in both the preview scenario and the recording scenario. For a representation form and a display position of the tracking box, refer to related description of a tracking box in FIG. 3B and/or FIG. 3C.

A quantity, specification, and display strategy of tracking boxes are described below with reference to FIG. 8A to FIG. 14.

In some embodiments, the terminal device may adaptively adjust a specification of a tracking box based on a size of a character.

It may be understood that, a larger size or area of a character in a capturing picture indicates a larger size of a tracking box; and a smaller size or area of the character indicates a smaller size of the tracking box. The capturing picture includes, but not limited to: a preview picture or a recording picture.

In some embodiments, a size of a character may be understood as a size of a face box, or may be understood as a size of a body box. The terminal device may adaptively adjust a specification of a tracking box based on the size of the face box, or may adaptively adjust the specification of the tracking box based on the size of the body box. This is not limited in this embodiment of this application.

It may be understood that, the terminal device may recognize a face of the character and a body of the character, to obtain the face box and/or the body box. Correspondingly, the terminal device may obtain the size of the face box and/or the size of the body box, to calculate the size of the tracking box.

Figure 8A:
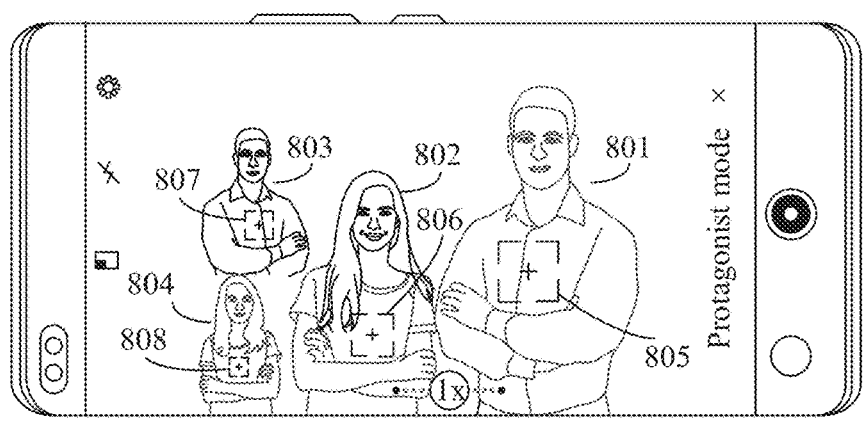
FIG. 8A is a schematic diagram of an interface in which a tracking box is displayed according to an embodiment of this application.

For example, FIG. 8A is a schematic diagram of an interface according to an embodiment of this application. As shown in FIG. 8A, the terminal device may recognize four characters and four tracking boxes in a preview picture shown in FIG. 8A. The four characters are respectively a character 801, a character 802, a character 803, and a character 804. The four tracking boxes are respectively a tracking box 805, a tracking box 806, a tracking box 807, and a tracking box 808. The character 801 corresponds to the tracking box 805; the character 802 corresponds to the tracking box 806; the character 803 corresponds to the tracking box 807; and the character 804 corresponds to the tracking box 808.

It can be seen from FIG. 8A that, areas occupied by the character 801, the character 802, the character 803, and the character 804 in the picture sequentially decrease. In this case, a size of the tracking box 805, a size of the tracking box 806, a size of the tracking box 807, and a size of the tracking box 808 sequentially decrease.

In some embodiments, the terminal device may adaptively adjust a specification of a tracking box based on a distance between a character and the terminal device. Alternatively, the distance between the character and the terminal device may be understood as a distance between the character and the camera of the terminal device, or may be understood as a focal length between the character and the camera.

Figure 8B:
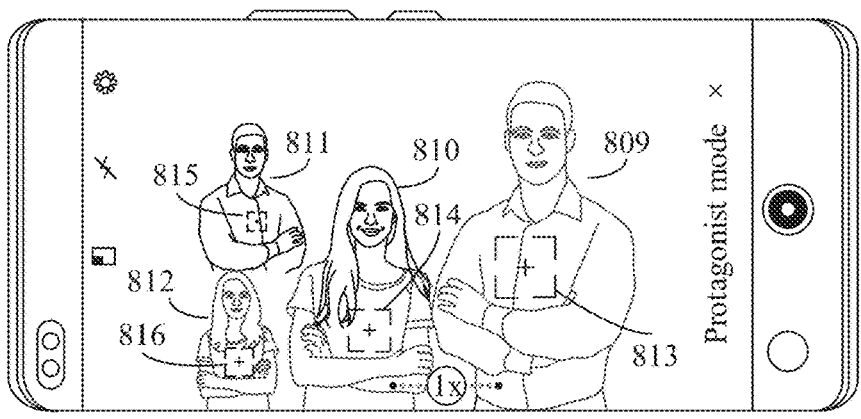
FIG. 8B is a schematic diagram of an interface in which a tracking box is displayed according to an embodiment of this application.

For example, FIG. 8B is a schematic diagram of an interface according to an embodiment of this application. As shown in FIG. 8B, the terminal device may recognize four characters and four tracking boxes in a preview picture shown in FIG. 8B. The four characters are respectively a character 809, a character 810, a character 811, and a character 812. The four tracking boxes are respectively a tracking box 813, a tracking box 814, a tracking box 815, and a tracking box 816. The character 809 corresponds to the tracking box 813; the character 810 corresponds to the tracking box 814; the character 811 corresponds to the tracking box 815; and the character 812 corresponds to the tracking box 816.

If the terminal device recognizes that a distance between the character 809 and the terminal device, a distance between the character 810 and the terminal device, a distance between the character 812 and the terminal device, and a distance between the character 811 and the terminal device sequentially decrease, a size of the tracking box 813, a size of the tracking box 814, a size of the tracking box 816, and a size of the tracking box 815 sequentially decrease.

In some embodiments, the terminal device displays a tracking box based on a preset size. It may be understood that, sizes of tracking boxes corresponding to characters in a capturing picture are the same. In this way, a situation in which a size of a tracking box is too small can be reduced.

Figure 8C:
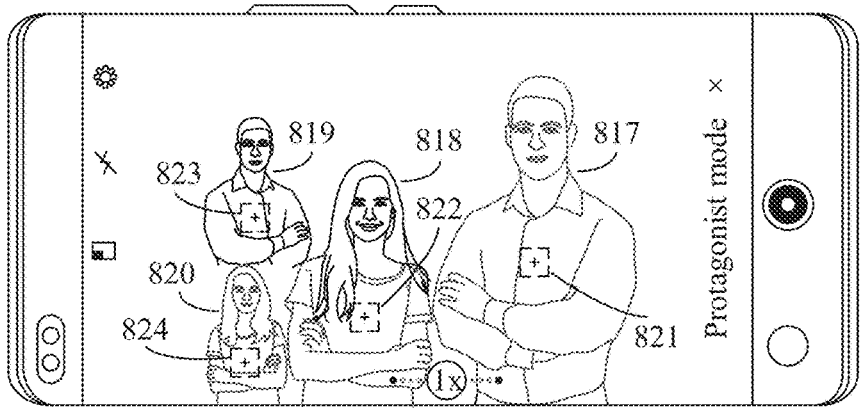
FIG. 8C is a schematic diagram of an interface in which a tracking box is displayed according to an embodiment of this application.

For example, FIG. 8C is a schematic diagram of an interface according to an embodiment of this application. As shown in FIG. 8C, the terminal device may recognize four characters and four tracking boxes in a preview picture shown in FIG. 8C. The four characters are respectively a character 817, a character 818, a character 819, and a character 820. The four tracking boxes are respectively a tracking box 821, a tracking box 822, a tracking box 823, and a tracking box 824. The character 817 corresponds to the tracking box 821; the character 818 corresponds to the tracking box 822; the character 819 corresponds to the tracking box 823; and the character 820 corresponds to the tracking box 824.

It can be seen from FIG. 8C that, an area of the character 817, an area of the character 818, an area of the character 819, and an area of the character 820 sequentially decrease, while a size of the tracking box 821, a size of the tracking box 822, a size of the tracking box 823, and a size of the tracking box 824 are the same. Alternatively, it may be understood that, a size of the character 817, a size of the character 818, a size of the character 819, and a size of the character 820 sequentially decrease, while the size of the tracking box 821, the size of the tracking box 822, the size of the tracking box 823 and the size of the tracking box 824 are the same.

Based on the foregoing embodiments, the terminal device may set a first threshold, where the first threshold indicates a maximum quantity of tracking boxes that can be displayed by the terminal device. For example, the first threshold may be 3 or 5. A specific value of the first threshold is not limited in this application. When the terminal device recognizes that a quantity of characters in a capturing picture is greater than the first threshold, some characters are displayed without corresponding tracking boxes.

In this way, interface clutter caused by excessive display of tracking boxes can be reduced, a user interface can be optimized, and false triggering of the tracking boxes can be reduced. In addition, computing resources can also be saved, and hardware standards of the terminal device can be reduced.

Figure 9A:
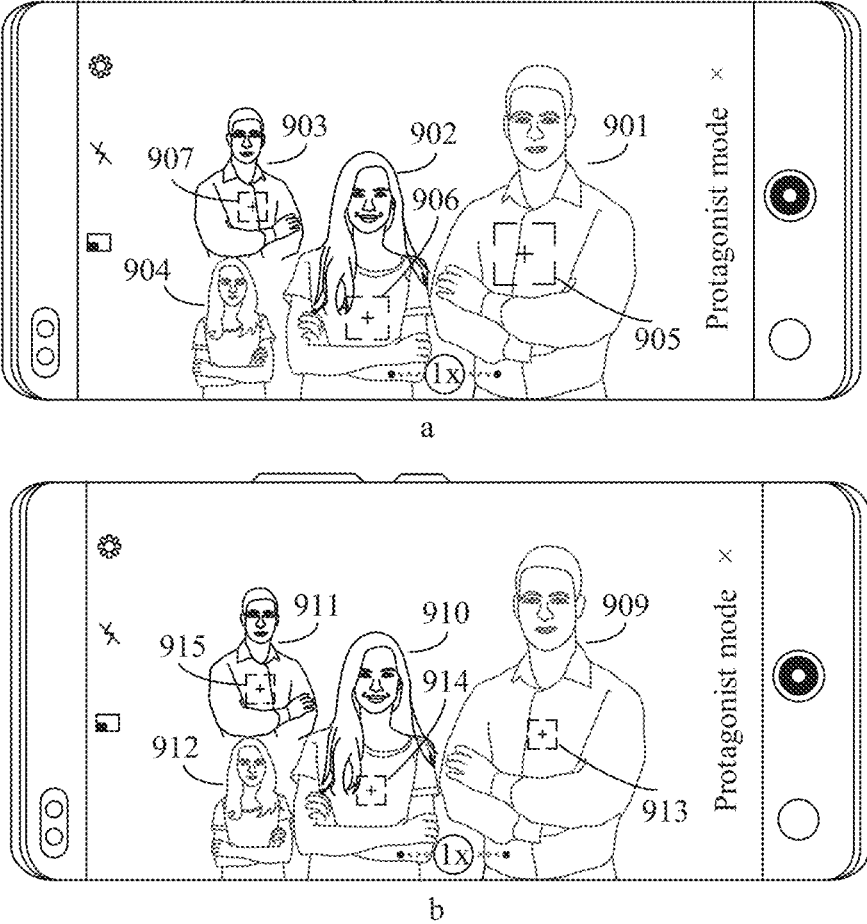
FIG. 9A is a schematic diagram of an interface in which a tracking box is displayed according to an embodiment of this application.

For example, by using the first threshold being 3 as an example, as shown in a of FIG. 9A, the terminal device displays four characters and three tracking boxes in a preview picture shown in a of FIG. 9A. The four characters are respectively a character 901, a character 902, a character 903, and a character 904. The three tracking boxes are respectively a tracking box 905, a tracking box 906, and a tracking box 907. The character 901 corresponds to the tracking box 905; the character 902 corresponds to the tracking box 906; the character 903 corresponds to the tracking box 907; and the character 904 does not correspond to a tracking box. A size of the tracking box 905, a size of the tracking box 906, and a size of the tracking box 907 sequentially decrease.

As shown in b of FIG. 9A, the terminal device displays four characters and three tracking boxes in a preview picture shown in b of FIG. 9A. The four characters are respectively a character 909, a character 910, a character 911, and a character 912. The three tracking boxes are respectively a tracking box 913, a tracking box 914, and a tracking box 915. The character 909 corresponds to the tracking box 913; the character 910 corresponds to the tracking box 914; the character 911 corresponds to the tracking box 915; and character 912 does not correspond to a tracking box. A size of the tracking box 913, a size of the tracking box 914, and a size of the tracking box 915 are the same.

In a possible implementation, the terminal device determines a character displayed with a tracking box based on a size of a character and a first threshold.

Specifically, if the first threshold is N, when the terminal device recognizes that a quantity of characters in a capturing picture is less than or equal to N, the characters are displayed with corresponding tracking boxes. When the terminal device recognizes that a quantity of characters in a capturing picture is greater than N, characters corresponding to top N sizes in character sizes sorted in descending order are displayed with corresponding tracking boxes, and remaining characters are displayed without corresponding tracking boxes.

For example, by using N being 3 as an example, as shown in a of FIG. 9A, characters corresponding to top N sizes in character size order are the character 901, the character 902, and the character 903. Therefore, the character 901, the character 902, and the character 903 each are displayed with the corresponding tracking boxes. The character 904 is displayed without the corresponding tracking box. For example, by using N being 3 as an example, as shown in b of FIG. 9A, characters corresponding to top N sizes in character size order are the character 909, the character 910, and the character 911. Therefore, the character 909, the character 910, and the character 911 each are displayed with the corresponding tracking boxes. The character 912 is displayed without the corresponding tracking box.

In a possible implementation, the terminal device determines a character displayed with a tracking box based on a distance between a character and the terminal device, and a first threshold.

Specifically, if the first threshold is N, when the terminal device recognizes that a quantity of characters in a capturing picture is less than or equal to N, the characters are displayed with corresponding tracking boxes. When the terminal device recognizes that a quantity of characters in a capturing picture is greater than N, characters corresponding to top N distances in distances between the characters and the terminal device sorted in descending order are displayed with corresponding tracking boxes, and remaining characters are displayed without corresponding tracking boxes.

It may be understood that, the terminal device may use technologies such as machine vision and a deep neural network to recognize a character in front of a camera used by the terminal device to capture, and calculate a distance between the character and the camera used by the terminal device to capture. The distance between the character and the camera used by the terminal device to capture may also be referred to as a distance between the character and the terminal device.

Figure 9B:
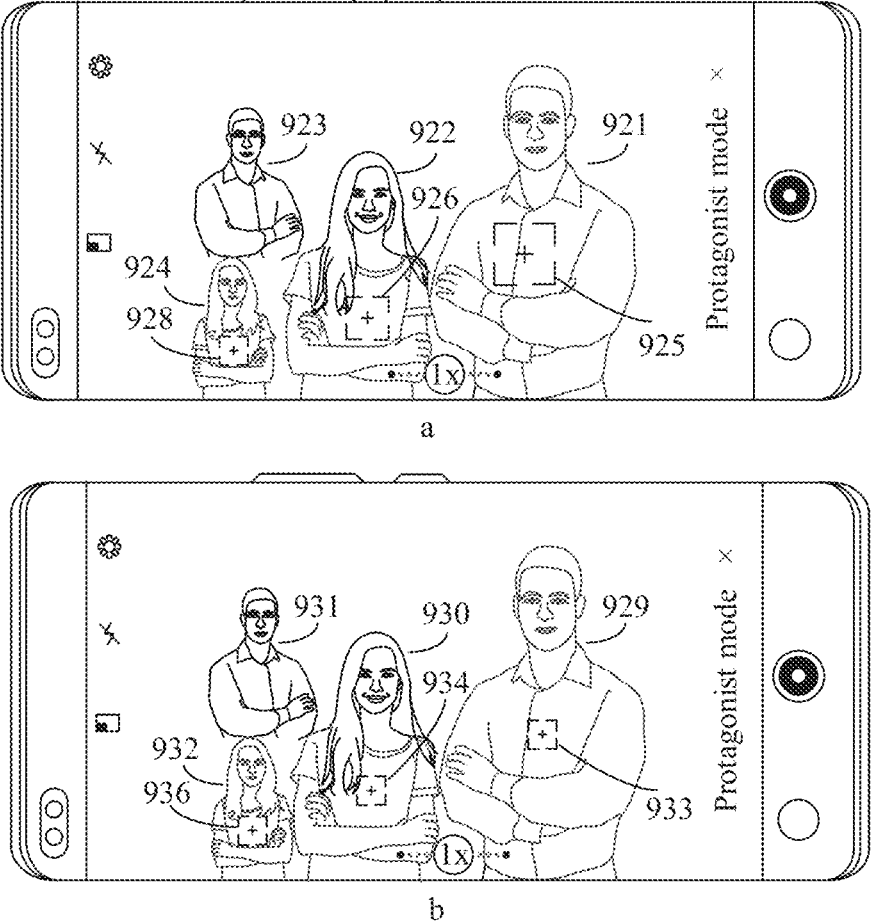
FIG. 9B is a schematic diagram of an interface in which a tracking box is displayed according to an embodiment of this application.

For example, by using the first threshold being 3 as an example, as shown in a of FIG. 9B, the terminal device displays four characters and three tracking boxes in a preview picture shown in a of FIG. 9B. The four characters are respectively a character 921, a character 922, a character 923, and a character 924. The three tracking boxes are respectively a tracking box 925, a tracking box 926, and a tracking box 928. The character 921 corresponds to the tracking box 925; the character 922 corresponds to the tracking box 926; the character 924 corresponds to the tracking box 928; and the character 923 does not correspond to a tracking box. A size of the tracking box 925, a size of the tracking box 926, and a size of the tracking box 928 sequentially decrease.

As shown in a of FIG. 9B, if the terminal device recognizes that a distance between the character 921 and the terminal device, a distance between the character 922 and the terminal device, a distance between the character 923 and the terminal device, and a distance between the character 924 and the terminal device sequentially decrease, the character 921, the character 922, and the character 924 each are displayed with corresponding tracking boxes. The character 923 is displayed without the corresponding tracking box.

For example, by using the N being 3 as an example, for example, by using the N being 3 as an example, as shown in b of FIG. 9B, the terminal device displays four characters and three tracking boxes in a preview picture shown in b of FIG. 9B. The four characters are respectively a character 929, a character 930, a character 931, and a character 932. The three tracking boxes are respectively a tracking box 933, a tracking box 934, and a tracking box 936. The character 929 corresponds to the tracking box 933; the character 930 corresponds to the tracking box 934; the character 932 corresponds to the tracking box 936; and the character 931 does not correspond to a tracking box. A size of the tracking box 933, a size of the tracking box 934, and a size of the tracking box 936 are the same.

As shown in b of FIG. 9B, if the terminal device recognizes that a distance between the character 929 and the terminal device, a distance between the character 930 and the terminal device, a distance between the character 932 and the terminal device, and a distance between the character 931 and the terminal device sequentially decrease, the character 929, the character 930, and the character 932 each are displayed with corresponding tracking boxes. The character 931 is displayed without the corresponding tracking box.

It may be understood that, a position of a tracking box is calculated in real time based on a character. When positions of characters are close or when characters overlap or are blocked, corresponding displayed tracking boxes may overlap.

Based on this, an embodiment of this application provides a plurality of tracking box display strategies, to reduce overlapping of tracking boxes, thereby reducing false triggering caused by overlapping of the tracking boxes.

For ease of understanding, a plurality of possible manners for the terminal device to determine a position of a tracking box are described below with reference to FIG. 10A to FIG. 10D.

It may be understood that, the terminal device may comprehensively determine a position of a tracking box based on related information of a face box and related information of a body box. In this embodiment of this application, the related information of the face box includes, but not limited to: a center position of the face box, a size of the face box, and the like. The related information of the body box includes, but not limited to: a center position of the body box, a size of the body box, and the like.

In Implementation 1, the terminal device calculates an average value based on a center of the face box and a center of the body box, to obtain a center of the tracking box.

Figure 10A:
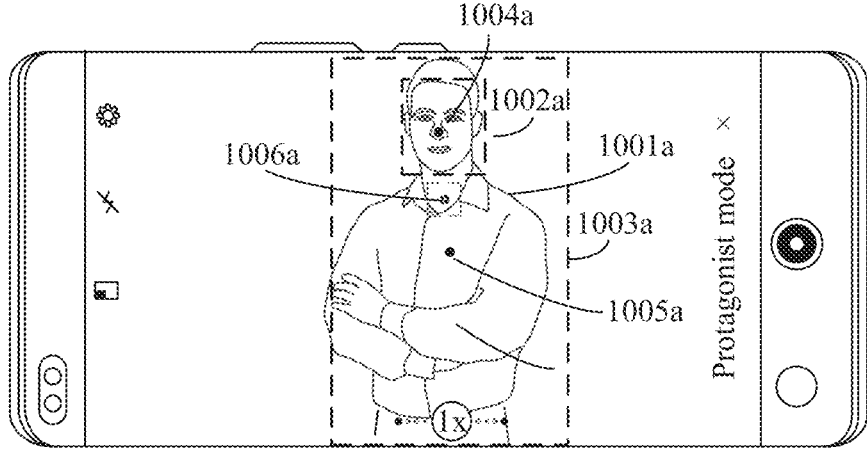
FIG. 10A is a schematic diagram of an interface in which a tracking box is displayed according to an embodiment of this application.

For example, as shown in FIG. 10A, the terminal device may recognize a face and a body of a character 1001a, to obtain a face box 1002a and a body box 1003a. Correspondingly, the terminal device may obtain a center 1004a of the face box and a center 1005a of the body box. The terminal device calculates an average value based on the center 1004a of the face box and the center 1005a of the body box, to obtain a center 1006a of the tracking box.

In Implementation 2, the terminal device may calculate a center position of the tracking box based on a center position of the face box, a center position of the body box, a first weight, and a second weight.

Figure 10B:
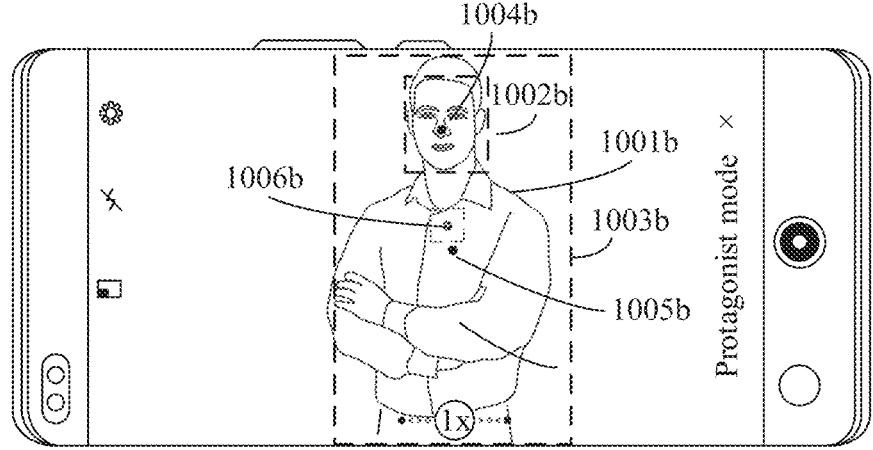
FIG. 10B is a schematic diagram of an interface in which a tracking box is displayed according to an embodiment of this application.

For example, by using an example in which the first weight is 0.2 and corresponds to the center position of the face box and the second weight is 0.8 and corresponds to the center position of the body box, as shown in FIG. 10B, the terminal device may recognize a face and a body of a character 1001b, to obtain a face box 1002b and a body box 1003b. Correspondingly, the terminal device may obtain a center 1004b of the face box and a center 1005b of the body box. The terminal device obtains a center 1006b of the tracking box based on the center 1004b of the face box, the center 1005b of the body box, the first weight, and the second weight.

In Implementation 3, a center position of the tracking box may alternatively be a center position of the body box.

Figure 10C:
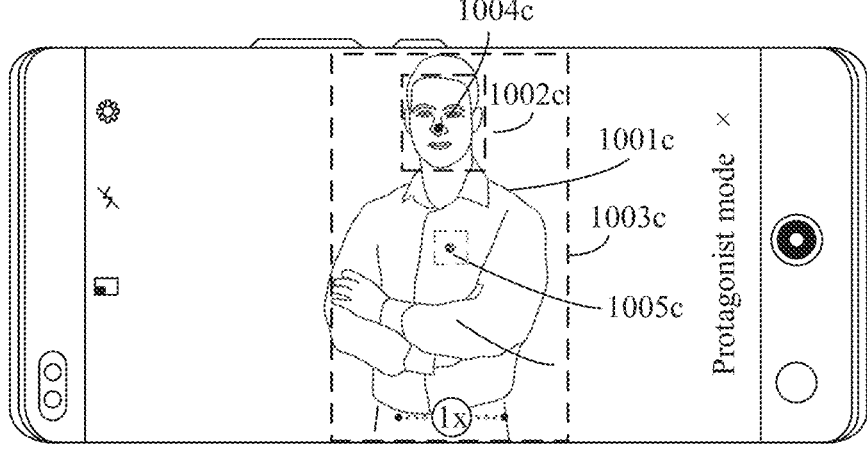
FIG. 10C is a schematic diagram of an interface in which a tracking box is displayed according to an embodiment of this application.

For example, as shown in FIG. 10C, the terminal device may recognize a face and a body of a character 1001c, to obtain a face box 1002c and a body box 1003c. Correspondingly, the terminal device may obtain a center 1004c of the face box and a center 1005c of the body box. The terminal device determines a center of the tracking box as the center 1005c of the body box.

In Implementation 4, the tracking box is adjacent to the face box.

Specifically, the terminal device determines a relative position of the tracking box and the face box based on a relative position of the face box and the body box, and a horizontal length and a vertical length of the body box, to determine a position of the tracking box.

Figure 10D:
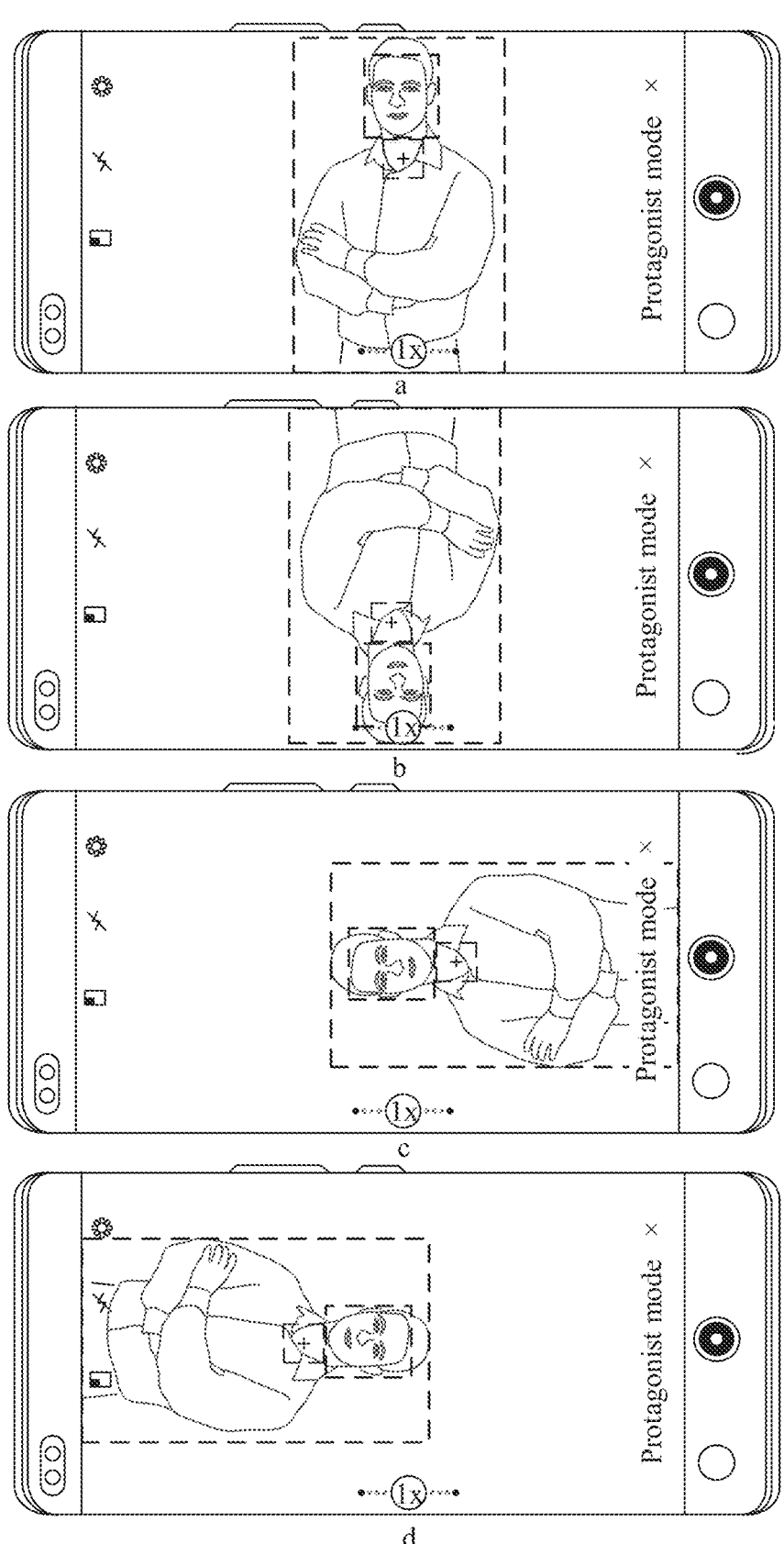
FIG. 10D is a schematic diagram of an interface in which a tracking box is moved according to an embodiment of this application.

For example, when the face box is located on an upper side of the body box and the horizontal length of the body box is less than or equal to the vertical length, the tracking box is located on a lower side of the face box (as shown in a of FIG. 10D); when the face box is located on the lower side of the body box and the horizontal length of the body box is less than or equal to the vertical length, the tracking box is located on the upper side of the face box (as shown in b of FIG. 10D); when the face box is located on a left side of the body box and the horizontal length of the body box is greater than the vertical length, the tracking box is located on a right side of the face box (as shown in c of FIG. 10D); and when the face box is located on the right side of the body box and the horizontal length of the body box is greater than the vertical length, the tracking box is located on the left side of the face box (as shown in d of FIG. 10D).

It may be understood that, the terminal device may also determine a position of a tracking box based on other manners or other conditions. The other conditions include: A spacing between the tracking box and the face box is greater than a preset spacing, the tracking box is located on a torso of the body, and the like. A specific manner for determining a position of a tracking box based on a single character is not limited in this embodiment of this application.

It may be understood that, the terminal device may recognize a plurality of characters, and display a plurality of tracking boxes. When positions of characters are close or when characters overlap or are blocked, corresponding displayed tracking boxes may overlap. A display strategy of tracking boxes in a scenario with a plurality of characters is described below with reference to FIG. 11A to FIG. 15.

It may be understood that, when the terminal device detects that the tracking boxes overlap or calculates that the tracking boxes overlap, the terminal device redetermines display positions of the tracking boxes, to reduce overlapping of the tracking boxes.

Specifically, the terminal device may reduce overlapping of the tracking boxes by moving a tracking box in a direction away from an overlapping region; or the terminal device may reduce overlapping of the tracking boxes by not displaying a tracking box corresponding to one character.

The following describes a display strategy of tracking boxes in a scenario in which sizes of the tracking boxes are a preset size, that is, in a scenario in which the sizes of the tracking boxes are the same.

In possible Implementation 1, when the tracking boxes overlap, the terminal device moves a tracking box in a direction away from an overlapping region. The direction away from the overlapping region includes, but not limited to: up, down, left, right, obliquely upward, obliquely downward, or the like. In this way, overlapping of the tracking boxes can be reduced.

It may be understood that, the terminal device may determine, based on positions and a preset size of two adjacent tracking boxes, whether the tracking boxes overlap. When a condition is not met, the terminal device may adjust a position of one of the tracking boxes based on a relative position between the two adjacent tracking boxes, or adjust the positions of the two tracking boxes, so that a distance between the two adjacent tracking boxes increases, thereby reducing overlapping of the tracking boxes.

For example, by using the tracking box being a rectangle as an example, the terminal device may calculate, based on center positions and the preset size of the two adjacent tracking boxes, a horizontal spacing and a vertical spacing between the center positions of the two adjacent tracking boxes, to determine whether the horizontal spacing and the vertical spacing meet a first preset condition. The first preset condition includes: A horizontal spacing is greater than or equal to a first preset horizontal spacing, and a vertical spacing is greater than or equal to a first preset vertical spacing.

When the first preset condition is not met, the tracking boxes overlap. To be specific, the horizontal spacing is less than the first preset horizontal spacing, and/or the vertical spacing is less than the first preset vertical spacing.

The terminal device may adjust a center position of one of the tracking boxes based on the relative position between the two adjacent tracking boxes, or respectively adjust the center positions of the two tracking boxes, so that any one of a horizontal spacing and a vertical spacing between the adjusted center positions of the two tracking boxes meets the first preset condition, thereby reducing overlapping of the tracking boxes.

A preset horizontal spacing may be a horizontal length of a tracking box, and a preset vertical may be a vertical length of the tracking box.

It may be understood that, the terminal device may also determine whether adjacent tracking boxes overlap based on other manners, which is not limited herein.

Figure 11A:
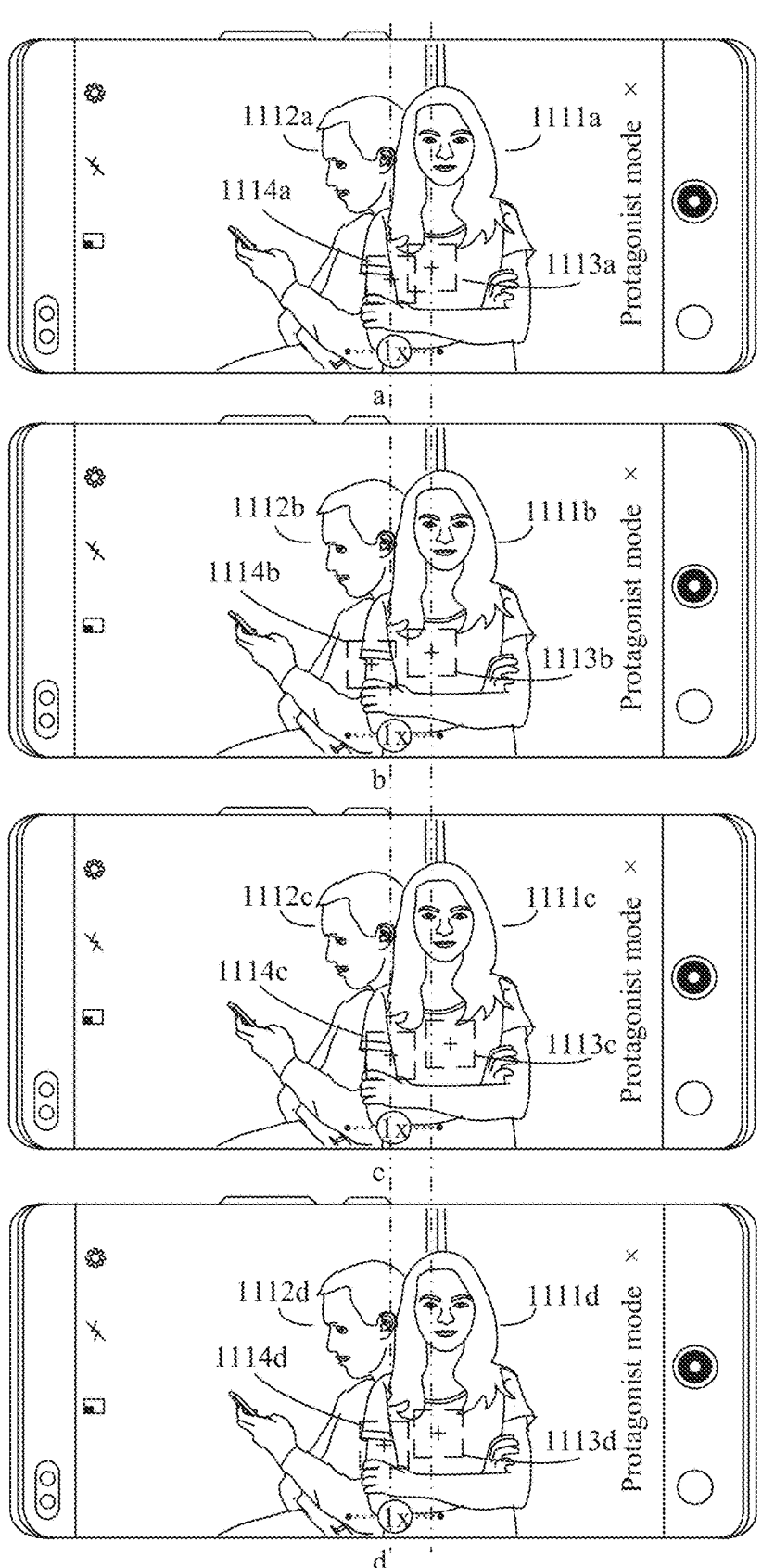
FIG. 11A is a schematic diagram of an interface in which a tracking box is displayed according to an embodiment of this application.

For example, FIG. 11A is a schematic diagram of an interface of a terminal device according to an embodiment of this application. When the terminal device calculates a tracking box based on a single character, the terminal device may enter an interface shown in a of FIG. 11A. A preview picture in the interface includes a character 1111a and a character 1112a. The character 1111a is displayed with a corresponding tracking box 1113a; and the character 1112a is displayed with a corresponding tracking box 1114a. The tracking box 1113a and the tracking box 1114a overlap.

Compared with a position of the tracking box calculated based on the single character, an adjusted position of the tracking box may be to the left. For example, if the terminal device reduces overlapping of the tracking boxes by moving a tracking box to the left, the terminal device may enter an interface shown in b of FIG. 11A. A preview picture in the interface includes a character 1111b and a character 1112b. The character 1111b is displayed with a corresponding tracking box 1113b; and the character 1112b is displayed with a corresponding tracking box 1114b. Compared with the tracking box 1113a, a display position of the tracking box 1113b is to the left. In the interface shown in b of FIG. 11A, the tracking box 1113b and the tracking box 1114b do not overlap.

Compared with a position of the tracking box calculated based on the single character, an adjusted position of the tracking box may be to the right. For example, if the terminal device reduces overlapping of the tracking boxes by moving a tracking box to the right, the terminal device may enter an interface shown in c of FIG. 11A. A preview picture in the interface includes a character 1111c and a character 1112c. The character 1111c is displayed with a corresponding tracking box 1113c; and the character 1112c is displayed with a corresponding tracking box 1114c. Compared with the tracking box 1114a, a display position of the tracking box 1114c is to the right. In the interface shown in c of FIG. 11A, the tracking box 1113c and the tracking box 1114c do not overlap.

Compared with a position of the tracking box calculated based on the single character, an adjusted position of one tracking box may be to the left, and an adjusted position of another tracking box may be to the right. For example, if the terminal device reduces overlapping of the tracking boxes by reversely moving two tracking boxes simultaneously, the terminal device may enter an interface shown in d of FIG. 11A. A preview picture in the interface includes a character 1111d and a character 1112d. The character 1111d is displayed with a corresponding tracking box 1113d; and the character 1112d is displayed with a corresponding tracking box 1114d. Compared with the tracking box 1113a, a display position of the tracking box 1113d is to the left. Compared with the tracking box 1114a, a display position of the tracking box 1114d is to the right. In the interface shown in d of FIG. 11A, the tracking box 1113d and the tracking box 1114d do not overlap.

In this way, overlapping of the tracking boxes can be reduced. Simultaneously moving two tracking boxes can also reduce offsets of the tracking boxes, to reduce a situation in which the tracking boxes do not correspond to the characters.

It may be understood that, the terminal device may move any tracking box in a direction away from the overlapping region. Alternatively, the terminal device may simultaneously move two tracking boxes in a direction away from the overlapping region.

Optionally, when a vertical length of the overlapping region is greater than or equal to a horizontal length of the overlapping region, the terminal device may reduce overlapping of the tracking boxes by translating to the left or right; and when the vertical length of the overlapping region is less than the horizontal length of the overlapping region, the terminal device may reduce overlapping of the tracking boxes by translating to the upper or lower. In this way, offsets of the tracking boxes can be reduced, to reduce a situation in which the tracking boxes do not correspond to the characters.

In possible Implementation 2, when positions of characters are close or when characters overlap or are blocked, the terminal device may not display a tracking box corresponding to one character. In this way, overlapping of the tracking boxes can be reduced.

In a possible implementation, when the tracking boxes overlap, the terminal device may not display a tracking box corresponding to one character.

Figure 11B:
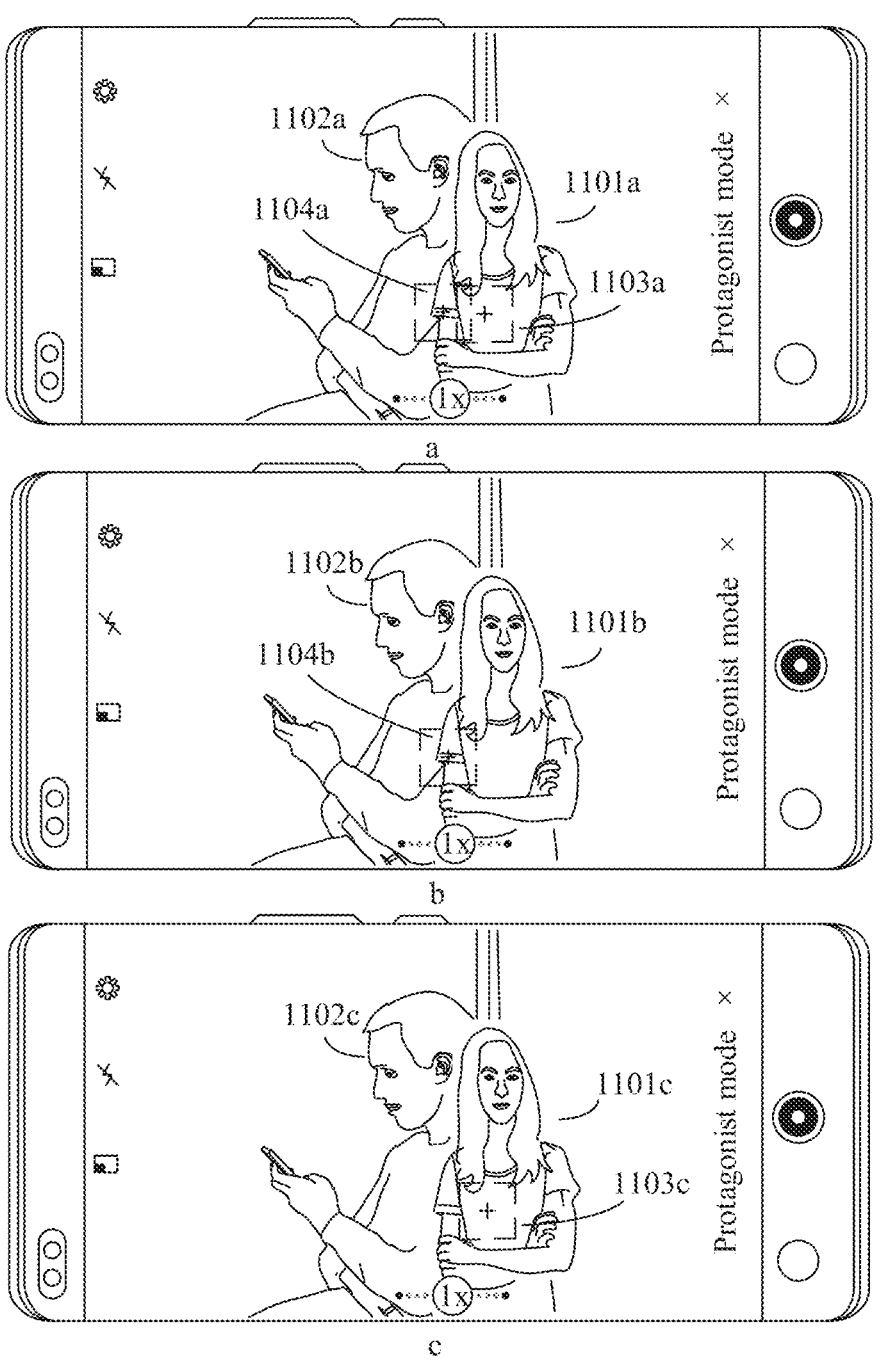
FIG. 11B is a schematic diagram of an interface in which a tracking box is displayed according to an embodiment of this application.

For example, as shown in a of FIG. 11B, a preview picture includes a character 1101a and a character 1102a. The character 1101a is displayed with a corresponding tracking box 1103a; and the character 1102a is displayed with a corresponding tracking box 1104a. The tracking box 1103a and the tracking box 1104a overlap.

If the terminal device reduces overlapping of the tracking boxes by reducing display of one tracking box, the terminal device may enter an interface shown in b of FIG. 11B. A preview picture in the interface includes a character 1101b and a character 1102b. The character 1101b is displayed without a corresponding tracking box; and the character 1102b is displayed with a corresponding tracking box 1104b. There is no phenomenon in which the tracking box corresponding to the character 1101b and the tracking box corresponding to the character 1102b overlap.

If the terminal device reduces overlapping of the tracking boxes by reducing display of one tracking box, the terminal device may also enter an interface shown in c of FIG. 11B. A preview picture in the interface includes a character 1101c and a character 1102c. The character 1101c is displayed with a corresponding tracking box 1103c; and the character 1102c is displayed without a corresponding tracking box. There is no phenomenon in which the tracking box corresponding to the character 1101c and the tracking box corresponding to the character 1102c overlap.

Optionally, when the tracking boxes overlap, the terminal device may not display a tracking box corresponding to a character with a smaller size. For example, in the interface shown in b of FIG. 11B, a size of the character 1101b is less than that of the character 1102b, and the tracking box corresponding to 1101b is not displayed.

Optionally, when the tracking boxes overlap, the terminal device may not display a tracking box corresponding to a character having a larger distance with the terminal device. For example, in the interface shown in c of FIG. 11B, a distance between the character 1102c and the terminal device is greater than a distance between the character 1101c and the terminal device; and the terminal device does not display the tracking box corresponding to 1102c, and displays the tracking box 1103c corresponding to the character 1101c.

The foregoing two possible implementations may be applied in the terminal device alone or together. This is not limited in this embodiment of this application.

When the two implementations are applied in the terminal device together, the terminal device may select an implementation based on an overlapping region of tracking boxes.

Specifically, the terminal device may select an implementation through an area, a size, or the like of the overlapping region.

Optionally, when a first value is less than or equal to a second threshold, the terminal device selects Implementation 1; and when the first value is greater than to the second threshold, the terminal device selects Implementation 2. The first value may be a ratio of an area of an overlapping region of tracking boxes to a total area of the overlapping tracking boxes; or the first value may be a ratio of the area of the overlapping region of the tracking boxes to an area of any tracking box, which is not limited herein. The second threshold may be 0.25 or 0.4. A value of the second threshold is not limited in this embodiment of this application.

Optionally, when a second value is less than or equal to a third threshold, or when a third value is less than or equal to the third threshold, the terminal device selects Implementation 1; and when the second value and the third value is both greater than to the third threshold, the terminal device selects Implementation 2.

The second value may be a ratio of a horizontal length of an overlapping region of tracking boxes to a total horizontal length of the overlapping tracking boxes, and the third value may be a ratio of a vertical length of the overlapping region of the tracking boxes to a total vertical length of the overlapping tracking boxes; or the second value may be a ratio of the horizontal length of the overlapping region of the tracking boxes to a horizontal length of any tracking box, and the third value may be a ratio of the vertical length of the overlapping region of the tracking boxes to a vertical length of any tracking box. Specific calculation manners of the second value and the third value are not limited in this embodiment of this application. The third threshold may be 0.25 or 0.4. A value of the third threshold is not limited in this embodiment of this application.

A horizontal length and other related terms of a tracking box are described below with reference to FIG. 12.

Figure 12:
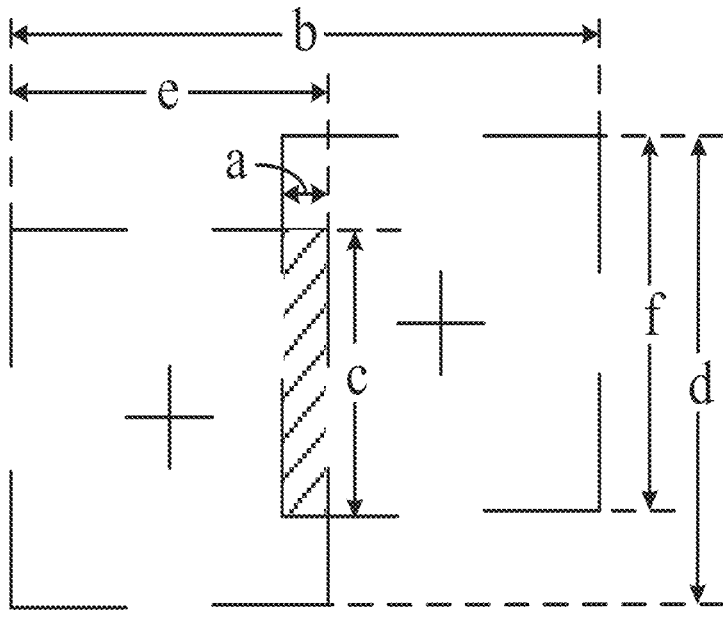
FIG. 12 is a schematic diagram in which tracking boxes overlap according to an embodiment of this application.

For example, as shown in FIG. 12, an overlapping region of tracking boxes is shaded slash portions in FIG. 12. A horizontal length of the overlapping region of the tracking boxes is a length of a line segment a; a total horizontal length of the overlapping tracking boxes is a length of a line segment b; a vertical length of the overlapping region of the tracking boxes is a length of a line segment c; a total vertical length of the overlapping tracking boxes is a length of a line segment d: a horizontal length of a tracking box is a length of a line segment e; and a vertical length of the tracking box is a length of a line segment f.

The following describes a display strategy of tracking boxes in a scenario in which adaptive adjustment is performed on sizes of the tracking boxes.

It may be understood that, the terminal device may reduce overlapping of the tracking boxes by moving a tracking box in a direction away from an overlapping region; or the terminal device may reduce overlapping of the tracking boxes by not displaying a tracking box corresponding to a character with a smaller size.

In possible Implementation 1, when the tracking boxes overlap, the terminal device reduces overlapping of the tracking boxes by moving a tracking box in a direction away from an overlapping region.

It may be understood that, the terminal device may determine, based on positions of two adjacent tracking boxes and sizes corresponding to the tracking boxes, whether the tracking boxes overlap. When a condition is not met, the terminal device may adjust a position of one of the tracking boxes based on a relative position between the two adjacent tracking boxes, or adjust the positions of the two tracking boxes, so that a distance between the two adjacent tracking boxes increases, thereby reducing overlapping of the tracking boxes.

For example, by using the tracking box being a rectangle as an example, the terminal device may calculate, based on center positions and a preset size of the two adjacent tracking boxes, a horizontal spacing and a vertical spacing between the center positions of the two adjacent tracking boxes, to determine whether the horizontal spacing and the vertical spacing meet a second preset condition. The second preset condition includes: A horizontal spacing is greater than or equal to a second preset horizontal spacing, and a vertical spacing is greater than or equal to a second preset vertical spacing.

The second preset horizontal spacing may be half of a sum of horizontal lengths of the two adjacent tracking boxes; and the second preset vertical spacing may be half of a sum of vertical lengths of the two adjacent tracking boxes.

When the second preset condition is not met, the tracking boxes overlap. To be specific, the horizontal spacing is less than the second preset horizontal spacing, and/or the vertical spacing is less than the second preset vertical spacing.

The terminal device may adjust a center position of one of the tracking boxes based on the relative position between the two adjacent tracking boxes, or respectively adjust the center positions of the two tracking boxes, so that any one of a horizontal spacing and a vertical spacing between the adjusted center positions of the two tracking boxes meets the second preset condition, thereby reducing overlapping of the tracking boxes.

It may be understood that, the terminal device may also determine whether adjacent tracking boxes overlap based on other manners, which is not limited herein.

It may be understood that, terminal device may reduce overlapping of the tracking boxes by moving any tracking box up, down, left, and/or right; or the terminal device may reduce overlapping of the tracking boxes by reversely moving two tracking boxes simultaneously.

Figure 13:
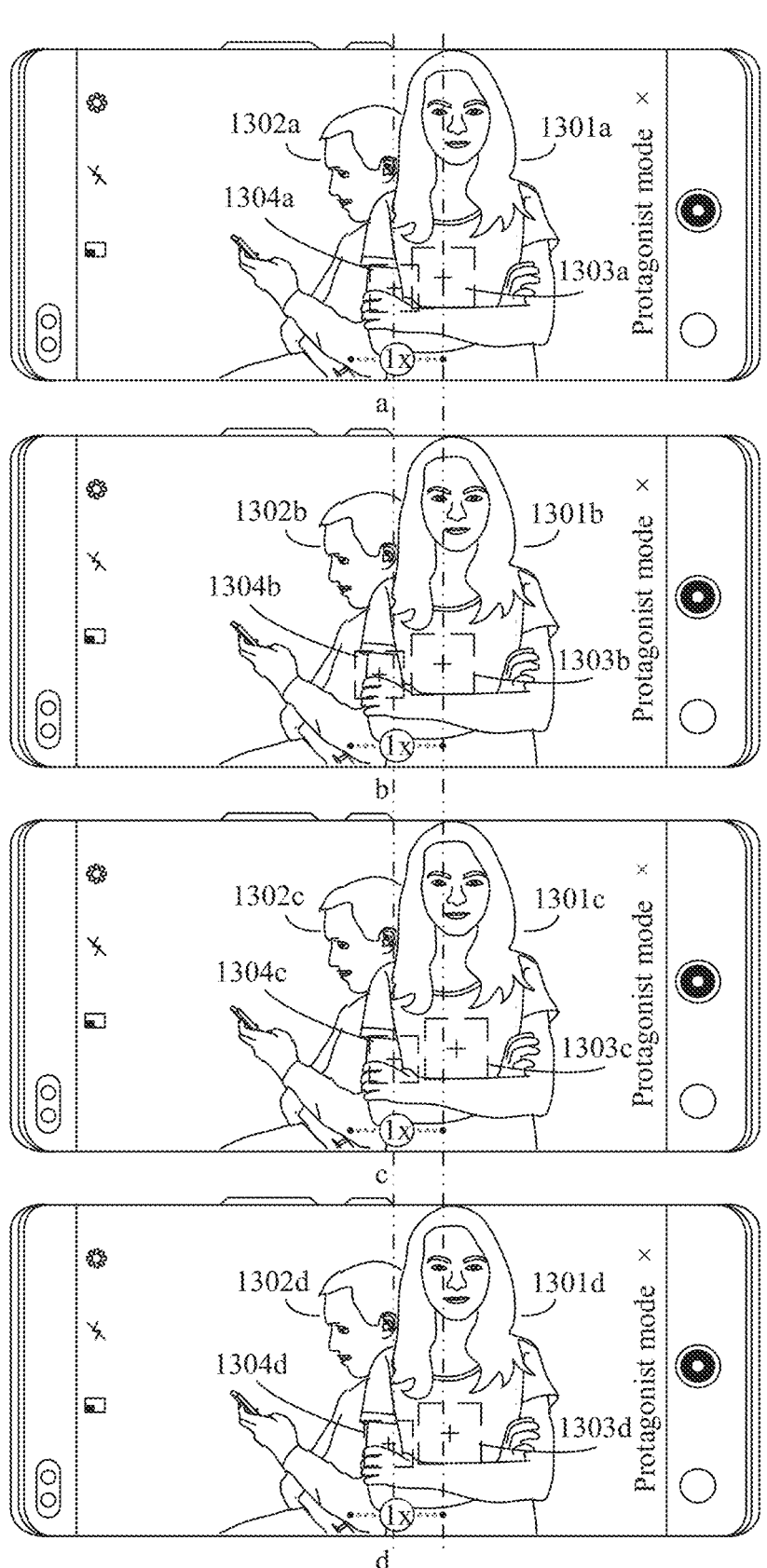
FIG. 13 is a schematic diagram of an interface in which a tracking box is moved according to an embodiment of this application.

For example, FIG. 13 is a schematic diagram of an interface of a terminal device according to an embodiment of this application. When the terminal device calculates a tracking box based on a single character, the terminal device may enter an interface shown in a of FIG. 13, where a preview picture includes a character 1301*a* and a character 1302*a*. The character 1301*a* is displayed with a corresponding tracking box 1303*a*; and the character 1302*a* is displayed with a corresponding tracking box 1304*a*. The tracking box 1303*a* and the tracking box 1304*a* overlap.

Compared with a position of the tracking box calculated based on the single character, an adjusted position of the tracking box may be to the left. For example, if the terminal device moves a tracking box corresponding to a character with a smaller size in a direction away from an overlapping region, the terminal device may reduce overlapping of the tracking boxes by moving the tracking box corresponding to the character with the smaller size to the left, and enter an interface shown in b of FIG. 13. A preview picture in the interface includes a character 1301*b* and a character 1302*b*. The character 1301*b* is displayed with a corresponding tracking box 1303*b*; and the character 1302*b* is displayed with a corresponding tracking box 1304*b*. Compared with the tracking box 1303*a*, a display position of the tracking box 1303*b* is to the left. In the interface shown in b of FIG. 13, the tracking box 1303*b* and the tracking box 1304*b* do not overlap.

Compared with a position of the tracking box calculated based on the single character, an adjusted position of the tracking box may be to the right. For example, if the terminal device moves a tracking box corresponding to a character with a larger size in a direction away from an overlapping region, the terminal device may reduce overlapping of the tracking boxes by moving the tracking box corresponding to the character with the larger size to the right, and enter an interface shown in c of FIG. 13. A preview picture in the interface includes a character 1301*c* and a character 1302*c*. The character 1301*c* is displayed with a corresponding tracking box 1303*c*; and the character 1302*c* is displayed with a corresponding tracking box 1304*c*. Compared with the tracking box 1304*a*, a display position of the tracking box 1304*c* is to the right. In the interface shown in c of FIG. 13, the tracking box 1303*c* and the tracking box 1304*c* do not overlap.

Compared with a position of the tracking box calculated based on the single character, an adjusted position of one tracking box may be to the left, and an adjusted position of another tracking box may be to the right. For example, if the terminal device reduces overlapping of the tracking boxes by reversely moving two tracking boxes simultaneously, the terminal device may enter an interface shown in d of FIG. 13. A preview picture in the interface includes a character 1301*d* and a character 1302*d*. The character 1301*d* is displayed with a corresponding tracking box 1303*d*; and the character 1302*d* is displayed with a corresponding tracking box 1304*d*. Compared with the tracking box 1303*a*, a display position of the tracking box 1303*d* is to the left. Compared with the tracking box 1304*a*, a display position of the tracking box 1304*d* is to the right. In the interface shown in d of FIG. 13, the tracking box 1303*d* and the tracking box 1304*d* do not overlap.

In this way, overlapping of the tracking boxes can be reduced. Simultaneously moving two tracking boxes can also reduce offsets of the tracking boxes, to reduce a situation in which the tracking boxes do not correspond to the characters.

It may be understood that, the terminal device may move a tracking box corresponding to a character with a smaller size in a direction away from the overlapping region. The terminal device may move a tracking box corresponding to a character with a larger size in a direction away from the overlapping region. Alternatively, the terminal device may simultaneously move two tracking boxes in a direction away from the overlapping region. A specific movement manner of a tracking box is not limited in this embodiment of this application.

Optionally, when a vertical length of the overlapping region is greater than or equal to a horizontal length of the overlapping region, the terminal device may reduce overlapping of the tracking boxes by translating to the left or right; and when the vertical length of the overlapping region is less than the horizontal length of the overlapping region, the terminal device may reduce overlapping of the tracking boxes by translating to the upper or lower. In this way, offsets of the tracking boxes can be reduced.

In possible Implementation 2, when positions of characters are close or when characters overlap or are blocked, the terminal device may not display a tracking box corresponding to one character. In this way, overlapping of the tracking boxes can be reduced.

In a possible implementation, when the tracking boxes overlap, the terminal device may not display a tracking box corresponding to one character.

Figure 14:
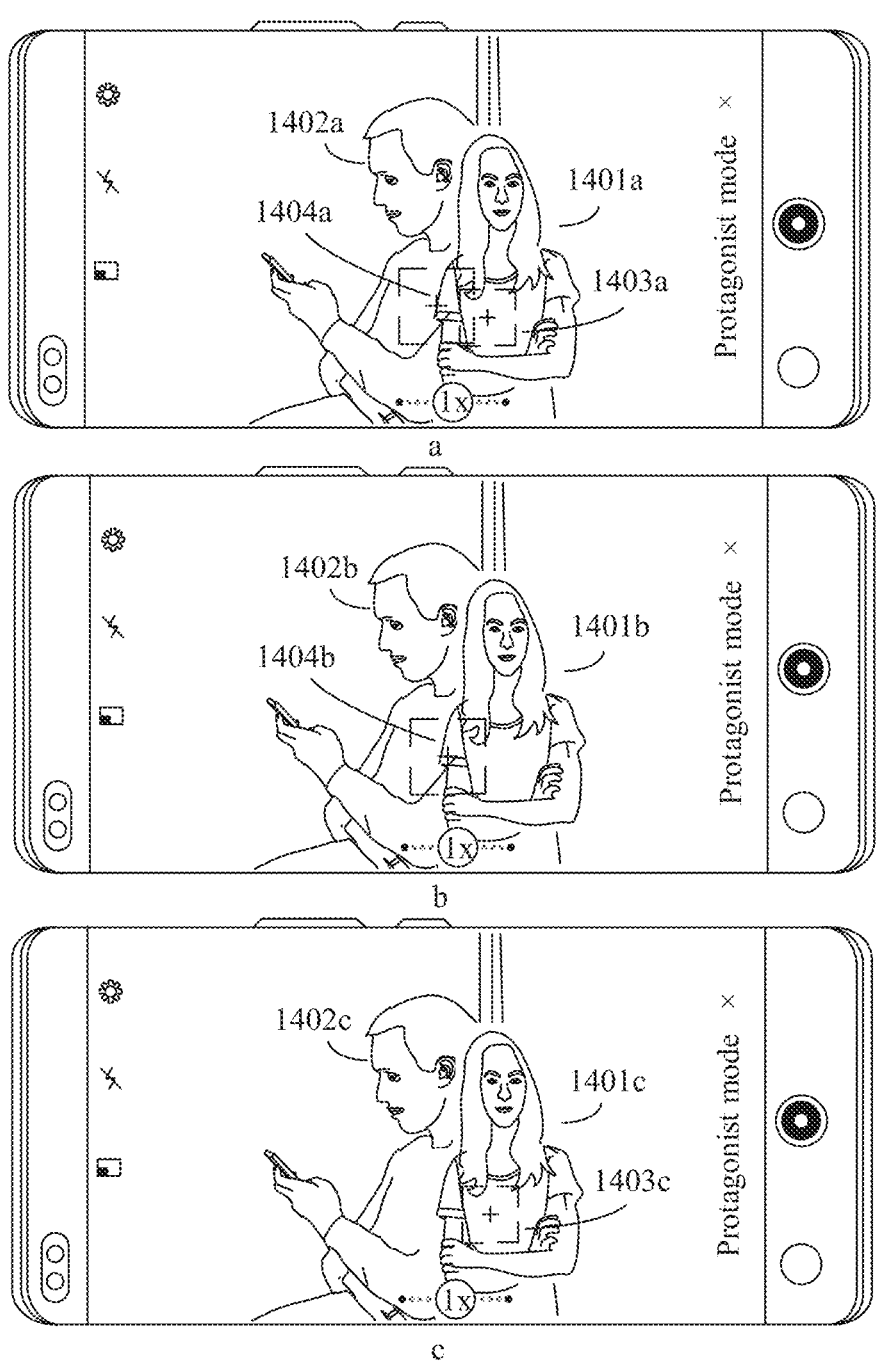
FIG. 14 is a schematic diagram of an interface in which a tracking box is displayed according to an embodiment of this application.

For example, as shown in a of FIG. 14, a preview picture includes a character 1401*a* and a character 1402*a*. The character 1401*a* is displayed with a corresponding tracking box 1403*a*; and the character 1402*a* is displayed with a corresponding tracking box 1404*a*. The tracking box 1403*a* and the tracking box 1404*a* overlap. When the terminal device determines a size of a tracking box based on a size of a character, a size of the tracking box 1404*a* is greater than a size of the tracking box 1403*a*.

If the terminal device reduces overlapping of the tracking boxes by reducing display of one tracking box, the terminal device may enter an interface shown in b of FIG. 14. A preview picture in the interface includes a character 1401*b* and a character 1402b. The character 1401b is displayed without a corresponding tracking box; and the character 1402b is displayed with a corresponding tracking box 1404b. There is no phenomenon in which the tracking box corresponding to the character 1401b and the tracking box corresponding to the character 1402b overlap.

If the terminal device reduces overlapping of the tracking boxes by reducing display of one tracking box, the terminal device may also enter an interface shown in c of FIG. 14. A preview picture in the interface includes a character 1401c and a character 1402c. The character 1401c is displayed with a corresponding tracking box 1403c; and the character 1402c is displayed without a corresponding tracking box. There is no phenomenon in which the tracking box corresponding to the character 1401c and the tracking box corresponding to the character 1402c overlap.

Optionally, when the tracking boxes overlap, the terminal device may not display a tracking box corresponding to a character with a smaller size. For example, in the interface shown in b of FIG. 14, a size of the character 1401b is less than that of the character 1402b, and the tracking box corresponding to 1401b is not displayed.

Optionally, when the tracking boxes overlap, the terminal device may not display a tracking box corresponding to a character having a larger distance with the terminal device. For example, in the interface shown in c of FIG. 14, a distance between the character 1402c and the terminal device is greater than a distance between the character 1401c and the terminal device; and the terminal device does not display the tracking box corresponding to 1402c, and displays the tracking box 1403c corresponding to the character 1401c.

Figure 15:
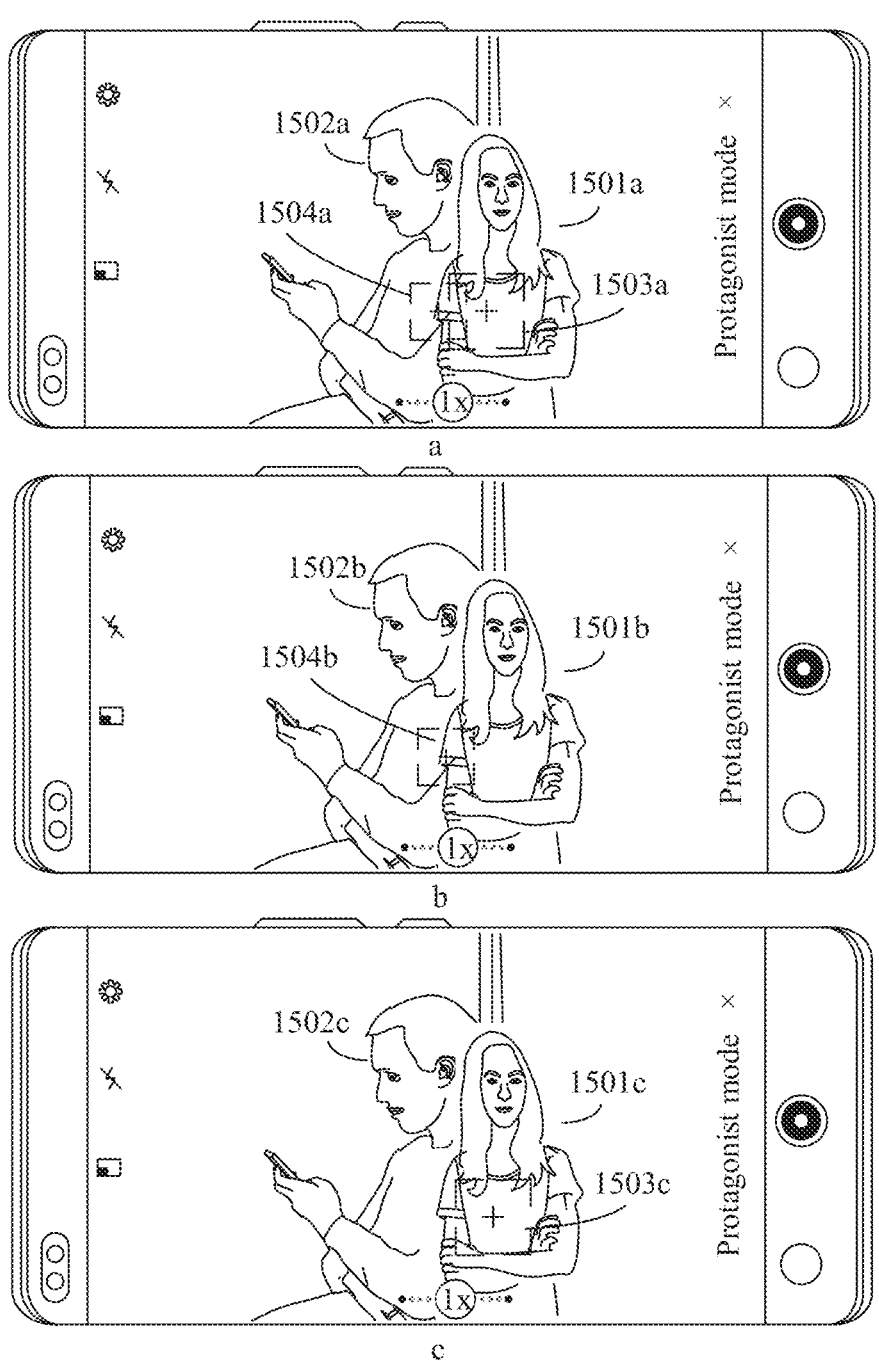
FIG. 15 is a schematic diagram of an interface in which a tracking box is displayed according to an embodiment of this application.

For example, as shown in a of FIG. 15, a preview picture includes a character 1501a and a character 1502a. The character 1501a is displayed with a corresponding tracking box 1503a; and the character 1502a is displayed with a corresponding tracking box 1504a. The tracking box 1503a and the tracking box 1504a overlap. When the terminal device determines a size of a tracking box based on a distance between a character and the terminal device, a size of the tracking box 1504a is less than a size of the tracking box 1503a.

If the terminal device reduces overlapping of the tracking boxes by reducing display of one tracking box, the terminal device may enter an interface shown in b of FIG. 15. A preview picture in the interface includes a character 1501b and a character 1502b. The character 1501b is displayed without a corresponding tracking box; and the character 1502b is displayed with a corresponding tracking box 1504b. There is no phenomenon in which the tracking box corresponding to the character 1501b and the tracking box corresponding to the character 1502b overlap.

If the terminal device reduces overlapping of the tracking boxes by reducing display of one tracking box, the terminal device may also enter an interface shown in c of FIG. 15. A preview picture in the interface includes a character 1501c and a character 1502c. The character 1501c is displayed with a corresponding tracking box 1503c; and the character 1502c is displayed without a corresponding tracking box. There is no phenomenon in which the tracking box corresponding to the character 1501c and the tracking box corresponding to the character 1502c overlap.

Optionally, when the tracking boxes overlap, the terminal device may not display a tracking box corresponding to a character with a smaller size. For example, in the interface shown in b of FIG. 15, a size of the character 1501b is less than that of the character 1502b, and the tracking box corresponding to 1501b is not displayed.

Optionally, when the tracking boxes overlap, the terminal device may not display a tracking box corresponding to a character having a larger distance with the terminal device. For example, in the interface shown in c of FIG. 15, a distance between the character 1502c and the terminal device is greater than a distance between the character 1501c and the terminal device; and the terminal device does not display the tracking box corresponding to 1502c, and displays the tracking box 1503c corresponding to the character 1501c.

The foregoing two possible implementations may be applied in the terminal device alone or together. This is not limited in this embodiment of this application.

When the two implementations are applied in the terminal device together, the terminal device may select an implementation based on an overlapping region of tracking boxes.

Specifically, the terminal device may select an implementation through an area, a size, or the like of the overlapping region.

Optionally, when a fourth value is less than or equal to a fourth threshold, the terminal device selects Implementation 1; and when the fourth value is greater than to the fourth threshold, the terminal device selects Implementation 2. The fourth value may be a ratio of an area of an overlapping region of tracking boxes to a total area of the overlapping tracking boxes; or the fourth value may be a ratio of the area of the overlapping region of the tracking boxes to an area of a tracking box with a smaller size, which is not limited herein. The fourth threshold may be 0.25 or 0.4. A value of the fourth threshold is not limited in this embodiment of this application.

Optionally, when a fifth value is less than or equal to a fifth threshold, or when a sixth value is less than or equal to the fifth threshold, the terminal device selects Implementation 1; and when the fifth value and the sixth value is both greater than to the fifth threshold, the terminal device selects Implementation 2.

The fifth value may be a ratio of a horizontal length of an overlapping region of tracking boxes to a total horizontal length of the overlapping tracking boxes, and the sixth value may be a ratio of a vertical length of the overlapping region of the tracking boxes to a total vertical length of the overlapping tracking boxes; or the fifth value may be a ratio of the horizontal length of the overlapping region of the tracking boxes to a horizontal length of any tracking box, and the sixth value may be a ratio of the vertical length of the overlapping region of the tracking boxes to a horizontal length of any tracking box. Specific calculation manners of the fifth value and the sixth value are not limited in this embodiment of this application. The fifth threshold may be 0.25 or 0.4. A value of the fifth threshold is not limited in this embodiment of this application.

Based on the foregoing embodiments, alternatively, the terminal device may comprehensively determine a movement direction and a movement distance of a tracking box based on a plurality of aspects such as a position of a face, and a position of a body of a character. Details are not described herein again. In this way, a situation in which the tracking boxes do not correspond to the characters can be reduced.

In the foregoing embodiments, the terminal device may additionally generate a focusing video based on a character as a tracking target. In a possible implementation, the terminal device may also additionally generate a focusing video based on an object such as a pet (such as a cat or a dog)

or a preset object (such as a vehicle) as a tracking target. Correspondingly, the object such as the pet (such as the cat or the dog) or the preset object (such as the vehicle) as the tracking target may also be displayed with a corresponding tracking box. For display of the tracking box, refer to the foregoing description. Details are not described herein again.

It may be understood that, the interface of the terminal device is only an example, and the interface of the terminal device may also include more or less content. In addition, a shape and a form of each control in the foregoing embodiments are only examples. Content of a display interface and the shape and the form of each control each are not limited in this embodiment of this application.

Based on the foregoing embodiments, an embodiment of this application provides a video recording method. For example, FIG. 16 is a schematic flowchart of a video recording method according to an embodiment of this application.

As shown in FIG. 16, the video recording method may include the following steps.

S1601: A terminal device displays a first interface, where the first interface includes a first window, and pictures acquired by the first camera in real time and one or more tracking identities are displayed in the first window.

The first window may be a preview region or a recording region as described above. The tracking identity may be a tracking box as described above, or may be in another form (for example, a thumbnail of an object, a number, or an icon), which is not limited herein. The tracking identity may alternatively be at a position at which an object is displayed, or may be arranged and displayed on an edge of the preview region or the recording region, which is not limited herein.

S1602: The terminal device receives a first operation for a first tracking identity, where the first tracking identity is one of the one or more tracking identities.

The first tracking identity may be a tracking identity corresponding to any object, for example, a tracking box corresponding to a male character.

A trigger operation for the first tracking identity may be a click operation, or may be a touch operation. A type of the trigger operation is not limited in this embodiment of this application.

S1603: The terminal device displays a second interface in response to the first operation, where the second interface includes the first window and a second window, the pictures acquired by the first camera in real time are displayed in the first window, a part of pictures related to a first object in the first window are displayed in the second window, and the first object is an object corresponding to the first tracking identity.

It may be understood that, in response to the first operation, a tracking target is set, and an interface with a small window is displayed. The part of pictures related to the first object in the first window may be understood as tracking pictures as described above. Before the tracking target is set, the terminal device does not display the small window. After the tracking target is set, the terminal device displays the small window.

S1604: The terminal device detects, at a first moment, that the first object is displayed at a first position of the first window, and a part of pictures that are related to the first object and that are at the first position of the first window are displayed in the second window.

S1605: The terminal device detects, at a second moment, that the first object is displayed at a second position of the first window, and a part of pictures that are related to the first object and that are at the second position of the first window are displayed in the second window.

In this embodiment of this application, a picture (a tracking picture) displayed in the second window changes with a position of a focusing target. Specifically, for how the picture displayed in the second window changes with the position of the tracking object, refer to FIG. 3B or FIG. 3C. For example, an interface at the first moment may be an interface shown in a of FIG. 3B, and an interface at the second moment may be an interface shown in b of FIG. 3B; or the interface at the first moment may be an interface shown in a of FIG. 3C, and the interface at the second moment may be an interface shown in b of FIG. 3C.

In conclusion, a terminal device may set a tracking target based on a tracking identity. After setting the tracking target, the terminal device may additionally obtain and display pictures corresponding to the tracking target, to additionally obtain one or more focusing videos corresponding to the tracking target while recording a video. In this way, a subsequent editing operation for the tracking target is reduced, thereby improving editing efficiency.

Optionally, the pictures displayed in the second window are obtained through cropping based on the pictures displayed in the first window.

Optionally, the first interface is a preview interface in a video recording process, the first window further includes a first control, and the method further includes: receiving, by the terminal device, a second operation for the first control; and ending, by the terminal device, recording in response to the second operation, and storing a first video and a second video, where the first video is a video formed by the pictures displayed in the first window, and the second video is a video formed by the pictures displayed in the second window.

In this embodiment of this application, the second operation may be a user click operation, or may be a user touch operation. The second operation is not limited in this embodiment of this application. The first video may be a video generated based on recording pictures displayed in the recording region, and the second video may be a video generated based on tracking pictures displayed in the small window.

The first control may be an end control. For example, the first control may be an end control 318 shown in a of FIG. 3C. When the terminal device detects an operation in which a user clicks the end control 318, the terminal device ends recording, generates a video based on recording pictures displayed in a recording region, and generates a focusing video based on tracking pictures displayed in a small window.

In this way, the terminal device may store two videos, and additionally generate a video based on the tracking target, without the need for video editing by the user, so that the video of the tracking target can be obtained, thereby improving user experience.

Optionally, the tracking identities are in a one-to-one correspondence with objects that are displayed in the first window and that are detected by the terminal device.

In this way, each tracking identity corresponds to one object, which can make it easier for the user to select an object, thereby improving user experience.

Optionally, the method further includes: when the terminal device detects that a second object and a third object in the first window overlap, displaying, by the terminal device, a second tracking identity of the second object or a third tracking identity of the third object.

It may be understood that, the second object and the third object are not a same object; or the second object or the third object may be the first object, which are not limited herein.

In this embodiment of this application, the second object and the third object may be a male character and a female character respectively in FIG. 11B, or a male character and a female character respectively in FIG. 14, which are not limited herein.

For example, for a specific display situation of an interface shown in FIG. 11B or an interface shown in FIG. 14, refer to corresponding descriptions in FIG. 11B and FIG. 14. Details are not described herein again.

In this way, the terminal device may not display a tracking identity corresponding to one object, which can reduce overlapping of tracking identities, reduce false triggering of the user, and also make the interface cleaner.

Optionally, the when the terminal device detects that a second object and a third object in the first window overlap, displaying, by the terminal device, a second tracking identity of the second object or a third tracking identity of the third object includes:

when the terminal device detects that the second object and the third object in the first window overlap, determining, by the terminal device based on one or more of the following information, that the terminal device displays the second tracking identity of the second object or the third tracking identity of the third object: an area occupied by the second object in the pictures of the first window, an area occupied by the third object in the pictures of the first window, a focal length between the second object and the first camera, and a focal length between the third object and the first camera.

An area occupied by an object may alternatively be understood as a size of the object, for example, an area occupied by a character and a size occupied by the character in descriptions corresponding to the interface shown in FIG. 11B as described above. A focal length of the object may be understood as a distance between the object and a camera, or may be understood as a distance between the object and the terminal device, for example, a distance between the character and a camera in the descriptions corresponding to the interface shown in FIG. 11B as described above.

The terminal device may determine a displayed tracking identity or a non-displayed tracking identity based on the area occupied by the object or the focal length of the object.

Optionally, the determining, by the terminal device based on one or more of the following information of the second object and the third object, that the terminal device displays the second tracking identity of the second object or the third tracking identity of the third object includes: when the area of the second object in the first window is less than or equal to the area of the third object in the first window, displaying, by the terminal device, the third tracking identity, and skipping displaying the second tracking identity; or when the terminal device detects that the focal length between the second object and the first camera is less than or equal to the focal length between the third object and the first camera, displaying, by the terminal device, the second tracking identity, and skipping displaying the third tracking identity.

It may be understood that, a larger area occupied by an object indicates a higher probability that the object is set by the user as a tracking target; and a smaller focal length between the object and the first camera indicates a closer distance between the object and the terminal device and a higher probability that the object is set by the user as the tracking target.

In this way, the terminal device may determine whether to display a tracking identity corresponding to the object based on the area occupied by the object, the focal length between the object and the first camera, and the like. For details, refer to corresponding descriptions in FIG. 11B and FIG. 14 as described above. Details are not described herein again.

Optionally, the method further includes: when a distance between a center position of the second tracking identity and a center position of the third tracking identity in a first preset direction is greater than or equal to a first preset spacing, or a distance between the center position of the second tracking identity and the center position of the third tracking identity in a second preset direction is greater than or equal to a second preset spacing, detecting, by the terminal device, that the second object and the third object in the first window overlap.

The first preset direction may be a horizontal direction, or may be a vertical direction, or may be a diagonal direction. The second preset direction may be a horizontal direction or a vertical direction, or may be a diagonal direction.

The terminal device may determine whether two objects overlap based on center positions of tracking identities corresponding to the two objects, to determine whether to display, which facilitates calculation of whether the objects overlap, and can reduce an amount of calculation.

Optionally, the first preset spacing is half of a sum of a first length and a second length, where the first length is a length of the second tracking identity in the first preset direction, and the second length is a length of the third tracking identity in the first preset direction; and the second preset spacing is half of a sum of a third length and a fourth length, where the third length is a length of the second tracking identity in the second preset direction, and the fourth length is a length of the third tracking identity in the second preset direction.

When tracking identities each are a rectangle or a square, a preset spacing is half of a sum of lengths of the tracking identities in a same direction.

Optionally, the first preset direction is a horizontal direction, and the second preset direction is a vertical direction.

Optionally, the method further includes: when a distance between a center position of a second tracking identity and a center position of a third tracking identity in a first preset direction is greater than or equal to a first preset spacing, or a distance between the center position of the second tracking identity and the center position of the third tracking identity in a second preset direction is greater than or equal to a second preset spacing, adjusting, by the terminal device, a position of the second tracking identity and/or a position of the third tracking identity, until the distance between the center position of the second tracking identity and the center position of the third tracking identity in the first preset direction is less than the first preset spacing, or the distance between the center position of the second tracking identity and the center position of the third tracking identity in the second preset direction is less than the second preset spacing.

When characters overlap or tracking identities overlap, the terminal device may reduce overlapping of the tracking identities by adjusting a position of a tracking identity. Another adjustment method is provided. In the adjustment method, the user may set any one of overlapped objects as a tracking target. For example, for a specific adjustment manner, refer to corresponding descriptions in FIG. 11A and FIG. 13 as described above. Details are not described herein again.

Optionally, when the terminal device displays a plurality of tracking identities, sizes of the tracking identities are the same.

For example, as shown in FIG. 8C, a size of a tracking box is fixed, which can reduce a situation in which the tracking box is too small or too large.

Optionally, when the terminal device displays a plurality of tracking identities, sizes of the tracking identities are different, where a size of each tracking identity is determined by the terminal device based on a size or an area occupied by an object corresponding to each tracking identity in the first window; or the size of each tracking identity is determined by the terminal device based on a focal length between the object corresponding to each tracking identity and the first camera.

For example, as shown in FIG. 8A and FIG. 8B, a size of a tracking box is fixed. The terminal device may adaptively adjust a specification of a tracking box based on a size of a character.

Optionally, the object includes the first object and a fourth object; and when a size of the first object in a first picture is greater than a size of the fourth object in the first picture, a size of the first tracking identity is greater than a size of a fourth tracking identity corresponding to the fourth object; or when an area of the first object in the first picture is greater than an area of the fourth object in the first picture, the size of the first tracking identity is greater than the size of the fourth tracking identity; or when the terminal device detects that a focal length between the first object and the first camera is greater than a focal length between the fourth object and the first camera, the size of the first tracking identity is greater than the size of the fourth tracking identity.

In this embodiment of this application, the fourth object is different from the first object, and may be the second object, or may be the third object, or may be another object, which is not limited herein.

The terminal device may display a plurality of tracking identities. The terminal device may adaptively adjust a specification of a tracking box based on a size of a character, a focal length between an object and the camera, and the like. Another manner for displaying a tracking identity is provided, to improve user experience.

Optionally, when a quantity of objects that are displayed in the first window and that are detected by the terminal device is greater than N, the first interface includes N tracking identities, where N is an integer.

N may be 5 or any another value. In this way, a quantity of tracking identities displayed when there are more objects can be limited, to reduce picture clutter caused by too many tracking identities. In addition, limiting the quantity of tracking identities can also reduce computing requirements of the terminal device, reduce freezing of the terminal device, reduce power consumption, and the like, and can also reduce hardware requirements of the terminal device and increase applicability.

Optionally, objects corresponding to the N tracking identities are objects of top N sizes in descending order of sizes of the objects in the first picture; or the objects corresponding to the N tracking identities are objects whose sizes are top N in ascending order of distances between the objects and the first camera and that are detected by the terminal device.

Optionally, when the terminal device displays the second interface, a focus of the first camera is on the first object; at the first moment, the focus of the first camera is on the first object; and at the second moment, the focus of the first camera is on the first object.

In this way, the terminal device may perform focusing based on a tracking target, making the tracking target clearer.

The video recording method provided in this embodiment of this application is described above, and an apparatus for performing the above method provided in an embodiment of this application is described below. FIG. 17 is a schematic diagram of a structure of a video recording apparatus according to an embodiment of this application. The video recording apparatus may be a terminal device in this embodiment of this application, or may be a chip or a chip system in the terminal device.

As shown in FIG. 17, a video recording apparatus 2100 may be used in a communication device, a circuit, a hardware component, or a chip, and the video recording apparatus includes: a display unit 2101 and a processing unit 2102. The display unit 2101 is configured to support the display steps performed by the video recording apparatus 2100. The processing unit 2102 is configured to support the information processing steps performed by the video recording apparatus 2100.

In a possible embodiment, the video recording apparatus 2100 may further include: a communication unit 2103. Specifically, the communication unit is configured to support the data sending step and the data receiving step performed by the video recording apparatus 2100. The communication unit 2103 may be an input or output interface, a pin, a circuit, or the like.

In a possible embodiment, the video recording apparatus may further include: a storage unit 2104. The processing unit 2102 is connected to the storage unit 2104 through a bus. The storage unit 2104 may include one or more memories, and the memory may be one or more devices or components in a circuit that are used to store a program or data. The storage unit 2104 may exist independently, and is connected to the processing unit 2102 included by the video recording apparatus by using a communication line. The storage unit 2104 may alternatively be integrated with the processing unit 2102.

The storage unit 2104 may store computer executable instructions of the method of the terminal device, so that the processing unit 2102 performs the method in the foregoing embodiments. The storage unit 2104 may be a register, a cache, a RAM, or the like, and the storage unit 2104 may be integrated with the processing unit 2102. The storage unit 2104 may be a read-only memory (ROM) or another type of static storage device that may store static information and instructions, and the storage unit 2104 may be independent of the processing unit 2102.

An embodiment of this application provides a terminal device. The terminal device may also be referred to as a terminal, a user equipment (UE), a mobile station (MS), a mobile terminal (MT), or the like. The terminal device may be a mobile phone, an intelligent television, a wearable device, a tablet computer (Pad), a computer with a wireless transceiver function, a virtual reality (VR) terminal device, an augmented reality (AR) terminal device, a wireless terminal in industrial control, a wireless terminal in self-driving, a wireless terminal in remote medical care, a wireless terminal in a smart grid, a wireless terminal in transportation safety, a wireless terminal in a smart city, a wireless terminal in a smart home, or the like.

The terminal device includes: a processor and a memory, where the memory stores computer executable instructions; and the processor reads the computer executable instructions stored in the memory, to enable the terminal device to perform the foregoing method.

An embodiment of this application provides a terminal device. For a structure thereof, refer to FIG. 1. A memory of the terminal device may be configured to store at least one program instruction, and a processor is configured to invoke the at least one program instruction, to implement the technical solutions of the foregoing method embodiments. An implementation principle and a technical effect thereof are similar to those of the foregoing related method embodiments. Details are not described herein again.

An embodiment of this application provides a chip. The chip includes a processor, and the processor is configured to invoke a computer program stored in a memory, to perform the technical solutions of the foregoing method embodiments. An implementation principle and a technical effect thereof are similar to those of the foregoing related embodiments. Details are not described herein again.

An embodiment of this application provides a computer program product. The computer program product, when run on an electronic device, enables the terminal device to perform the technical solutions of the foregoing method embodiments. An implementation principle and a technical effect thereof are similar to those of the foregoing related embodiments. Details are not described herein again.

An embodiment of this application provides a computer-readable storage medium, storing program instructions. The program instructions, when executed by a terminal device, enables the terminal device to perform the technical solutions of the foregoing method embodiments. An implementation principle and a technical effect thereof are similar to those of the foregoing related embodiments. Details are not described herein again. All or some of methods in the foregoing embodiments may be implemented by using software, hardware, firmware, or any combination thereof. If implemented in software, the functions may be stored on or transmitted over as one or more instructions or code on a computer-readable medium or a computer-readable medium. The computer-readable medium may include a computer storage medium and a communication medium, and may further include any medium that can transmit a computer program from one place to another. The storage medium may be any target medium accessible by a computer.

The computer-readable medium may include a RAM, a ROM, an EEPROM, a compact disc read-only memory (CD-ROM), or another optical disc storage or disk storage medium, or another magnetic storage device, or any other medium that can carry or store required program code in a form of an instruction or a data structure and can be accessed by a computer. Any connection line may also be appropriately referred to as a computer-readable medium. For example, if software is transmitted from a website, a server or another remote source by using a coaxial cable, an optical fiber cable, a twisted pair, a digital subscriber line (DSL) or wireless technologies (such as infrared ray, radio, and microwave), the coaxial cable, optical fiber cable, twisted pair, DSL or wireless technologies such as infrared ray, radio, and microwave are included in the definition of the medium. A magnetic disk and an optical disc used herein include an optical disc, a laser disc, an optical disc, a digital versatile disc (DVD), a floppy disk, and a blue ray disc, where the magnetic disk generally reproduces data in a magnetic manner, and the optical disc reproduces data optically by using laser. The foregoing combination should also be included in the scope of the computer readable medium.

Embodiments of this application are described with reference to the flowcharts and/or block diagrams of a method, a device (system), and computer program products of embodiments of this application. It should be understood that computer program instructions may be used to implement each process and/or each block in the flowcharts and/or the block diagrams and a combination of a process and/or a block in the flowcharts and/or the block diagrams. These computer program instructions may be provided to a general-purpose computer, a dedicated computer, an embedded processor, or a processing unit of another programmable device to generate a machine, so that the instructions executed by the computer or the processing unit of the another programmable device generate an apparatus for implementing a specified function in one or more procedures in the flowcharts and/or in one or more blocks in the block diagrams.

The objectives, technical solutions, and benefits of this application are further described in detail in the foregoing specific embodiments. It should be understood that the foregoing descriptions are merely specific embodiments of this application, but are not intended to limit the protection scope of this application. Any modification, equivalent replacement or improvement made based on the technical solutions in this application shall fall within the protection scope of this application.

The invention claimed is:

1. A video recording method, applied to a terminal device comprising a first camera, the method comprising:

displaying, by the terminal device, a first interface, wherein the first interface comprises a first window, and pictures acquired by the first camera and one or more tracking identities are displayed in the first window;

receiving, by the terminal device, a first operation for a first tracking identity, wherein the first tracking identity is one of the one or more tracking identities;

displaying, by the terminal device, a second interface in response to the first operation, wherein the second interface comprises the first window and a second window, the pictures acquired by the first camera are displayed in the first window, a part of pictures related to a first object in the first window are displayed in the second window, and the first object is an object corresponding to the first tracking identity;

detecting, by the terminal device at a first moment, that the first object is displayed at a first position of the first window, and a part of pictures that are related to the first object and that are at the first position of the first window are displayed in the second window;

detecting, by the terminal device at a second moment, that the first object is displayed at a second position of the first window, and a part of pictures that are related to the first object and that are at the second position of the first window are displayed in the second window; and based on the terminal device detecting that a second object and a third object in the first window overlap, displaying, by the terminal device based on one or more pieces of information, one of a second tracking identity of the second object or a third tracking identity of the third object but not both of the second tracking identity of the second object and the third tracking identity of the third object;

wherein the one or more pieces of information include a focal length between the second object and the first camera and a focal length between the third object and the first camera.

2. The method according to claim 1, wherein the pictures displayed in the second window are obtained through cropping based on the pictures displayed in the first window.

3. The method according to claim 1, wherein the first interface is a preview interface in a video recording process, the first window further comprises a first control, and the method further comprises:

receiving, by the terminal device, a second operation for the first control; and ending, by the terminal device, recording in response to the second operation, and storing a first video and a second video, wherein the first video is a video formed by the pictures displayed in the first window, and the second video is a video formed by the pictures displayed in the second window.

4. The method according to claim 1, wherein the one or more tracking identities are in a one-to-one correspondence with objects that are displayed in the first window and that are detected by the terminal device.

5. The method according to claim 1, wherein displaying one of the second tracking identity of the second object or the third tracking identity of the third object but not both of the second tracking identity of the second object and the third tracking identity of the third object comprises:

when the terminal device detects that the focal length between the second object and the first camera is less than or equal to the focal length between the third object and the first camera, displaying, by the terminal device, the second tracking identity, and skipping displaying the third tracking identity.

6. The method according to claim 1, wherein when a distance between a center position of the second tracking identity and a center position of the third tracking identity in a first preset direction is greater than or equal to a first preset spacing, or a distance between the center position of the second tracking identity and the center position of the third tracking identity in a second preset direction is greater than or equal to a second preset spacing, the terminal device detects that the second object and the third object in the first window overlap.

7. The method according to claim 6, wherein the first preset spacing is half of a sum of a first length and a second length, wherein the first length is a length of the second tracking identity in the first preset direction, and the second length is a length of the third tracking identity in the first preset direction; and wherein the second preset spacing is half of a sum of a third length and a fourth length, wherein the third length is a length of the second tracking identity in the second preset direction, and the fourth length is a length of the third tracking identity in the second preset direction.

8. The method according to claim 7, wherein the first preset direction is a horizontal direction, and the second preset direction is a vertical direction.

9. The method according to claim 1, wherein the method further comprises:

when a distance between a center position of a second tracking identity and a center position of a third tracking identity in a first preset direction is greater than or equal to a first preset spacing, or a distance between the center position of the second tracking identity and the center position of the third tracking identity in a second preset direction is greater than or equal to a second preset spacing, adjusting, by the terminal device, a position of the second tracking identity and/or a position of the third tracking identity, until the distance between the center position of the second tracking identity and the center position of the third tracking identity in the first preset direction is less than the first preset spacing, or the distance between the center position of the second tracking identity and the center position of the third tracking identity in the second preset direction is less than the second preset spacing.

10. The method according to claim 1, wherein when the terminal device displays a plurality of tracking identities, sizes of the tracking identities are the same.

11. The method according to claim 1, wherein when the terminal device displays a plurality of tracking identities, sizes of the tracking identities are different; and wherein:

a size of each tracking identity is determined by the terminal device based on a size or an area occupied by an object corresponding to each tracking identity in the first window; or the size of each tracking identity is determined by the terminal device based on a focal length between the object corresponding to each tracking identity and the first camera.

12. The method according to claim 11, wherein the object comprises the first object and a fourth object; and wherein:

when a size of the first object in a first picture is greater than a size of the fourth object in the first picture, a size of the first tracking identity is greater than a size of a fourth tracking identity corresponding to the fourth object; or when an area occupied by the first object in the first picture is greater than an area occupied by the fourth object in the first picture, the size of the first tracking identity is greater than the size of the fourth tracking identity; or when the terminal device detects that a focal length between the first object and the first camera is greater than a focal length between the fourth object and the first camera, the size of the first tracking identity is greater than the size of the fourth tracking identity.

13. The method according to claim 1, wherein when a quantity of objects that are displayed in the first window and that are detected by the terminal device is greater than N, the first interface comprises N tracking identities, wherein N is an integer.

14. The method according to claim 13, wherein objects corresponding to the N tracking identities are objects of top N sizes in descending order of sizes of the objects in the first picture; or wherein the objects corresponding to the N tracking identities are objects whose sizes are top N in ascending order of distances between the objects and the first camera and that are detected by the terminal device.

15. The method according to claim 1, wherein when the terminal device displays the second interface, a focus of the first camera is on the first object;

wherein at the first moment, the focus of the first camera is on the first object; and wherein at the second moment, the focus of the first camera is on the first object.

16. An electronic device, comprising:

one or more memories storing one or more programs; and one or more processors, wherein when the one or more programs are executed by the one or more processors, the electronic device is enabled to perform operations comprising:

displaying a first interface, wherein the first interface comprises a first window, and pictures acquired by the first camera and one or more tracking identities are displayed in the first window;

receiving a first operation for a first tracking identity, wherein the first tracking identity is one of the one or more tracking identities;

displaying a second interface in response to the first operation, wherein the second interface comprises the first window and a second window, the pictures acquired by the first camera are displayed in the first window, a part of pictures related to a first object in the first window are displayed in the second window, and the first object is an object corresponding to the first tracking identity;

detecting, at a first moment, that the first object is displayed at a first position of the first window, and a part of pictures that are related to the first object and that are at the first position of the first window are displayed in the second window;

detecting, at a second moment, that the first object is displayed at a second position of the first window, and a part of pictures that are related to the first object and that are at the second position of the first window are displayed in the second window; and based on detecting that a second object and a third object in the first window overlap, displaying, based on one or more pieces of information, one of a second tracking identity of the second object or a third tracking identity of the third object but not both of the second tracking identity of the second object and the third tracking identity of the third object;

wherein the one or more pieces of information include a focal length between the second object and the first camera and a focal length between the third object and the first camera.

17. A non-transitory computer-readable storage medium storing a computer program, that when executed by a processor, causes a computing device to perform operations comprising:

displaying a first interface, wherein the first interface comprises a first window, and pictures acquired by the first camera and one or more tracking identities are displayed in the first window;

receiving a first operation for a first tracking identity, wherein the first tracking identity is one of the one or more tracking identities;

displaying a second interface in response to the first operation, wherein the second interface comprises the first window and a second window, the pictures acquired by the first camera are displayed in the first window, a part of pictures related to a first object in the first window are displayed in the second window, and the first object is an object corresponding to the first tracking identity;

detecting, at a first moment, that the first object is displayed at a first position of the first window, and a part of pictures that are related to the first object and that are at the first position of the first window are displayed in the second window;

detecting, at a second moment, that the first object is displayed at a second position of the first window, and a part of pictures that are related to the first object and that are at the second position of the first window are displayed in the second window; and based on detecting that a second object and a third object in the first window overlap, displaying, based on one or more pieces of information, one of a second tracking identity of the second object or a third tracking identity of the third object but not both of the second tracking identity of the second object and the third tracking identity of the third object;

wherein the one or more pieces of information include a focal length between the second object and the first camera and a focal length between the third object and the first camera.

* * * * *